(12) United States Patent
Ma

(10) Patent No.: US 10,755,276 B2
(45) Date of Patent: Aug. 25, 2020

(54) EVENT PROCESSING METHOD, APPARATUS AND ELECTRONIC DEVICE BASED ON BLOCKCHAIN TECHNOLOGY

(71) Applicant: ALIBABA GROUP HOLDING LIMITED, Grand Cayman (KY)

(72) Inventor: Baoli Ma, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/699,603

(22) Filed: Nov. 30, 2019

(65) Prior Publication Data

US 2020/0193434 A1 Jun. 18, 2020

(30) Foreign Application Priority Data

Dec. 14, 2018 (CN) .......................... 2018 1 1530101

(51) Int. Cl.
*G06Q 20/40* (2012.01)
*G06Q 20/38* (2012.01)
(Continued)

(52) U.S. Cl.
CPC ......... *G06Q 20/401* (2013.01); *G06Q 20/389* (2013.01); *G06Q 20/3823* (2013.01);
(Continued)

(58) Field of Classification Search
CPC ............. G06Q 20/401; G06Q 20/3823; G06Q 20/389; H04L 9/008; H04L 9/0618; H04L 9/0643; H04L 2209/38
(Continued)

(56) References Cited

U.S. PATENT DOCUMENTS 7,062,472 B2   6/2006  Dan et al.
10,055,446 B2  8/2018  Pattanaik et al.
(Continued)

FOREIGN PATENT DOCUMENTS

CN    106845960 A    6/2017
CN    107194798 A    9/2017
(Continued)

OTHER PUBLICATIONS

Bunz et al. ("Bulletproofs: Short Proof for Confidential Transactions and More", 45 pages, Jul. 1, 2018) (Year: 2018).*
(Continued)

*Primary Examiner* — James D Nigh
(74) *Attorney, Agent, or Firm* — Sheppard Mullin Richter & Hampton LLP

(57) ABSTRACT

One or more embodiments of the specification provide a method, apparatus, and non-transitory computer-readable storage medium for processing an event involving a plurality of users in a blockchain. The method is implementable by any user involved in the event, the method comprising: generating, by a computing device of the user of the event, descriptive information of the event; sending the descriptive information to a computing device of another user of event through an off-chain channel for the another user to verify the descriptive information and to submit triggering information associated with the another user corresponding to the event to the blockchain after verifying the descriptive information; and submitting, by the computing device of the user, triggering information associated with the user corresponding to the event to the blockchain for the blockchain to process the event according to the descriptive information after verifying all triggering information submitted by the plurality of users.

18 Claims, 7 Drawing Sheets

(51) Int. Cl.
*H04L 9/06* (2006.01)
*H04L 9/00* (2006.01)

(52) U.S. Cl.
CPC ............ *H04L 9/008* (2013.01); *H04L 9/0618* (2013.01); *H04L 9/0643* (2013.01); *H04L 2209/38* (2013.01)

(58) Field of Classification Search
USPC .......................................................... 705/75
See application file for complete search history.

(56) References Cited

U.S. PATENT DOCUMENTS

| | | | |
|---|---|---|---|
| 2016/0292672 A1 | 10/2016 | Fay et al. | |
| 2016/0358165 A1* | 12/2016 | Maxwell | G06Q 20/0655 |
| 2017/0310747 A1 | 10/2017 | Cohn et al. | |
| 2017/0316391 A1 | 11/2017 | Peikert et al. | |
| 2017/0345011 A1 | 11/2017 | Salami et al. | |
| 2018/0005186 A1 | 1/2018 | Hunn | |
| 2018/0007131 A1 | 1/2018 | Cohn et al. | |
| 2018/0041345 A1* | 2/2018 | Maim | G06F 21/51 |
| 2018/0139056 A1 | 5/2018 | Imai et al. | |
| 2018/0174255 A1 | 6/2018 | Hunn et al. | |
| 2018/0218176 A1 | 8/2018 | Voorhees et al. | |
| 2018/0253702 A1 | 9/2018 | Dowding | |
| 2018/0308072 A1 | 10/2018 | Smith et al. | |
| 2018/0315141 A1 | 11/2018 | Hunn et al. | |
| 2018/0341648 A1 | 11/2018 | Kakavand et al. | |
| 2019/0020629 A1* | 1/2019 | Baird, III | G06F 16/27 |
| 2019/0108140 A1 | 4/2019 | Deshpande et al. | |
| 2019/0122317 A1 | 4/2019 | Hunn et al. | |
| 2019/0130394 A1 | 5/2019 | Stollman et al. | |
| 2019/0180276 A1 | 6/2019 | Lee et al. | |
| 2019/0182257 A1 | 6/2019 | Lee et al. | |
| 2019/0188787 A1 | 6/2019 | Besanson Tuma et al. | |
| 2019/0199693 A1 | 6/2019 | Vityaz | |
| 2019/0205873 A1 | 7/2019 | Kamalsky et al. | |
| 2019/0236879 A1* | 8/2019 | Ivanov | H04L 9/088 |
| 2019/0266145 A1 | 8/2019 | Qiu et al. | |
| 2019/0288853 A1 | 9/2019 | Gray | |
| 2019/0310900 A1 | 10/2019 | Lee et al. | |
| 2019/0311437 A1 | 10/2019 | Sivakumar et al. | |
| 2019/0318329 A1 | 10/2019 | Castinado et al. | |
| 2019/0327082 A1 | 10/2019 | Ow et al. | |
| 2019/0334715 A1 | 10/2019 | Gray | |
| 2019/0347653 A1 | 11/2019 | Lu et al. | |
| 2019/0378128 A1 | 12/2019 | Moore et al. | |
| 2020/0028693 A1* | 1/2020 | Wu | G09C 5/00 |

FOREIGN PATENT DOCUMENTS

| | | |
|---|---|---|
| CN | 107807951 A | 3/2018 |
| CN | 108389129 A | 8/2018 |
| CN | 108632045 A | 10/2018 |
| CN | 108764874 A | 11/2018 |
| CN | 108846659 A | 11/2018 |
| EP | 3576033 A1 | 12/2019 |
| WO | 2018/137316 A1 | 8/2018 |
| WO | 2018/226868 A1 | 12/2018 |
| WO | 2019211691 A1 | 11/2019 |

OTHER PUBLICATIONS

Bunz et al. ("Bulletproofs: Short Proofs for Confidential Transactions and More", 45 pages, Jul. 1, 2018) (Year: 2018).*
First Office Action for Chinese Application No. 201811530090.X dated Apr. 17, 2020.
Written Opinion and International Search Report for PCT Application No. PCT/US2019/063895 dated Mar. 20, 2020.
Written Opinion and International Search Report for PCT Application No. PCT/US2019/063631 dated Mar. 4, 2020.
Cecchetti et al., "Solidus: Confidential Distributed Ledger Transactions via PVORM," IACR, Apr. 10, 2017.
First Search Report for Chinese Application No. 201811530101.4 dated Apr. 10, 2020.
First Office Action for Chinese Application No. 201811530101.4 dated Apr. 17, 2020.
First Search Report for Chinese Application No. 201811530090.X dated Apr. 10, 2020.
Office Action for U.S. Appl. No. 16/697,972 dated Mar. 24, 2020.
Buterin, "Ethereum White Paper: A Next Generation Smart Contract & Decentralized Application Platform," Ethereum.org, all pages, (Year: 2016).
Bunz et al., "Bulletproofs: Efficient Range Proofs for Confidential Transactions," 39th IEEE Symposium onSecurity and Privacy, May 2018, all pages. (Year: 2018).
Franca, "Homomorphic Mini-blockchain Scheme," 2015. (Year: 2015).
Damgard et al., "Perfect Hiding and Perfect Binding Universally Composable Commitment Schemes with Constant Expansion Factor," CRYPTO 2002, LNCS 2442, pp. 581-296, 2002, all pages. (Year: 2002).
Shmatikov, Vitaly, "Introduction to Zero-Knowledge," cs.utexas. edu/-shmat/courses/cs380s_fall09/16zk.ppt, web.archive.org, all pages. (Year: 2017) (Year: 2017).
Groth, "Homomorphic Trapdoor Commitments to Group Elements," all pages. (Year: 2009).

* cited by examiner

EVENT PROCESSING METHOD, APPARATUS AND ELECTRONIC DEVICE BASED ON BLOCKCHAIN TECHNOLOGY

CROSS REFERENCE TO RELATED APPLICATION

The present application is based on and claims priority to Chinese Patent Application No. 201811530101.4, filed on Dec. 14, 2018, which is incorporated herein by reference in its entirety.

TECHNICAL FIELD

One or more embodiments of the specification relate to the field of blockchain technologies, particularly to a blockchain-based event processing method, apparatus, and electronic device.

BACKGROUND

In related technologies, an event on a blockchain may be implemented by a single user, or by a plurality of users. In a scenario where the event involves a plurality of users, a complete and successful implementation of the event requires a coordination among the users of the event.

SUMMARY

Accordingly, one or more embodiments of the specification provide a method, apparatus, and non-transitory computer-readable storage medium for processing an event involving a plurality of users in a blockchain. In the specification, "a user of the event" is equivalent to "a user involved in the event" or "a participant of the event."

According to a first aspect of one or more embodiments of the specification, a blockchain-based event processing method for processing an event involving a plurality of users in a blockchain is provided, the method comprising: generating, by a computing device of a user of the event, descriptive information of the event; sending the descriptive information to a computing device of another user of the event through an off-chain channel for the another user to verify the descriptive information and to submit triggering information associated with the another user corresponding to the event to the blockchain after verifying the descriptive information; and submitting, by the computing device of the user, triggering information associated with the user associated with the user corresponding to the event to the blockchain for the blockchain to process the event according to the descriptive information after verifying all triggering information submitted by the plurality of users.

The specification further provides a system for processing a blockchain-based event involving a plurality of users, comprising one or more processors and one or more computer-readable memories coupled to the one or more processors and having instructions stored thereon that are executable by the one or more processors to perform the event processing method described in the first aspect. The specification further provides a non-transitory computer-readable storage medium configured with instructions executable by one or more processors to cause the one or more processors to perform the event processing method described in the first aspect.

According to a second aspect of one or more embodiments of the specification, a blockchain-based event processing method for processing an event involving a plurality of users in a blockchain is provided, the method comprising: obtaining, by a computing device of a user of the event, descriptive information of the event, the descriptive information being sent by a computing device of another user of the event through an off-chain channel; and submitting, by the computing device of the user, triggering information associated with the user corresponding to the event to the blockchain after verifying the descriptive information for the blockchain to process the event according to the descriptive information after verifying all triggering information submitted by the plurality of users.

The specification further provides a system for processing a blockchain-based event involving a plurality of users, comprising one or more processors and one or more computer-readable memories coupled to the one or more processors and having instructions stored thereon that are executable by the one or more processors to perform the event processing method described in the second aspect. The specification further provides a non-transitory computer-readable storage medium configured with instructions executable by one or more processors to cause the one or more processors to perform the event processing method described in the second aspect.

According to a third aspect of one or more embodiments of the specification, a blockchain-based event processing method for processing an event involving a plurality of users in a blockchain is provided, the method comprising: verifying, by a blockchain node, triggering information submitted by a computing device of a user of the event, wherein the triggering information is submitted after the user verifies descriptive information of the event; and processing the event based on the descriptive information after verifying all triggering information submitted by the plurality of users.

The specification further provides a system for processing a blockchain-based event involving a plurality of users, comprising one or more processors and one or more computer-readable memories coupled to the one or more processors and having instructions stored thereon that are executable by the one or more processors to perform the event processing method described in the third aspect. The specification further provides a non-transitory computer-readable storage medium configured with instructions executable by one or more processors to cause the one or more processors to perform the event processing method described in the third aspect.

DETAILED DESCRIPTION OF THE INVENTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the specification. Rather, they are examples of the apparatuses and methods described in detail in the attached claims and consistent with some aspects of one or more embodiments of the specification.

In some embodiments, it is not necessary to perform steps in the methods according to the sequence illustrated and described in the specification. In some other embodiments, the steps of the methods may be more or less than those described in the specification. Further, a single step described in the specification may be split into multiple steps for description in other embodiments, while multiple steps described in the specification may be merged into one single step for description in yet other embodiments.

Figure 1:
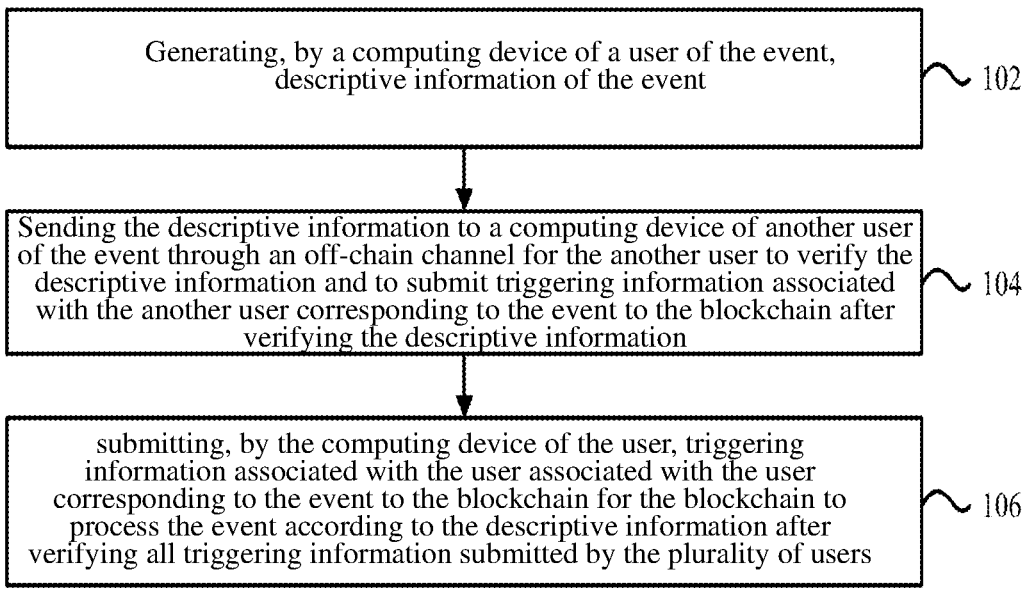
FIG. 1 is a flowchart of a blockchain-based event processing method according to some embodiments.

FIG. 1 is a flowchart of a blockchain-based event processing method according to some embodiments. As shown in FIG. 1, the method is implementable by any one of a plurality of users involved in an event and may include the following steps.

Step 102, generating, by a computing device of a user, descriptive information of the event.

In the specification, "a user" may also refer to "a computing device associated with the user" or vice versa for convenience of the description.

In some embodiments, an event may involve a plurality of users, and each user may correspond to a participation object. The participation object may be an individual, an enterprise, an organization, and the like, which is not limited in the specification. The participation object has a corresponding digital identity, so that an electronic device carrying the digital identity is equivalent to being configured as a user corresponding to the participation object.

In some embodiments, the event in the specification may include any type of event or scenario including, for example, voting, signing an agreement, flow distribution, transfer, and cross-border remittance, which are not limited in the specification. Using voting as an example, descriptive information may include information such as a voting subject and voting options, and triggering information submitted by each user to the blockchain may include a voting option selection result, thereby triggering implementation of a voting operation.

In some embodiments, the descriptive information of the event may include a variable, and the event may change a state parameter recorded on the blockchain associated with each of the plurality users according to the variable. For example, the value of the state parameter may be increased or decreased. The state parameter may also be different according to a different type of the event or a different scenario. For example, in a transfer or a cross-border remittance scenario, the state parameter may be an account balance of the user. In another example, in a flow distribution scenario, the state parameter may be the amount of remaining flow held by the user.

In some embodiments, the value of the state parameter corresponding to each user and the variable may be each a plaintext. Each blockchain node in the blockchain maintains a blockchain ledger, and the blockchain ledger records full transaction data, so that a blockchain node can obtain the value of the state parameter corresponding to each user. Further, the user may submit a transaction to the blockchain, where the transaction includes the triggering information. After reaching a consensus, the transaction can be executed based on the value of the state parameter corresponding to the user and the variable, e.g., changing the value of the state parameter according to the variable.

In some embodiments, the value of the state parameter corresponding to each user and the variable are each a ciphertext calculated based on a homomorphic encryption algorithm or a homomorphic commitment algorithm. Any type of homomorphic encryption algorithm may be used, provided that the homomorphic encryption algorithm can satisfy addition homomorphism, so that the value of the state parameter can be increased or decreased according to the variable even in a ciphertext state. Whether the homomorphic encryption algorithm is an addition homomorphic encryption algorithm, or a fully homomorphic encryption algorithm is not limited in the specification. As to the homomorphic commitment algorithm, some embodiments may adopt Pedersen commitment mechanism, which determines a random number, calculates a corresponding commitment data based on the random number and unencrypted data (e.g., the plaintext of the state parameter or the variable). The commitment data may be used as the ciphertext.

In some embodiments, when the value of the state parameter and the variable are ciphertexts, the user may provide related proof information for blockchain nodes to validate when executing the corresponding transaction. For example, the user may provide a proof indicating that the value of the variable is in a correct numerical range, e.g., $[0,2^{64})$. In another example, when the event decreases the value of the state parameter according to the variable, the user may provide a proof indicating the value of the state parameter is not less than the decrease in the value (where the decrease in the value is equal to the value of the variable).

In some embodiments, a range proof technique, such as a Bulletproofs scheme or a Borromean ring signature scheme, may be used to generate the foregoing proof information. This is not limited by embodiments of the specification.

Step 104: sending the descriptive information to another user involved in the event through an off-chain channel for the another user to verify the descriptive information and to submit triggering information associated with the another user corresponding to the event to the blockchain after verifying the descriptive information.

In some embodiments, the descriptive information may be efficiently transferred to another user of the event through an off-chain channel. The off-chain channel may be an encrypted channel or secure channels in other forms established between users of the event, to prevent information leakage.

In some embodiments, the descriptive information is generated by the user of the event to describe the event. The descriptive information is sent to another user of the event for the another user to verify the descriptive information, thereby determine whether the event is allowed to be executed. The descriptive information may comprise execution logic of the related event, users involved, how the state parameter of each of the involved users is changed (for example, the value of the state parameter is increased or decreased), a variable, any other suitable information, or any combination thereof. In fact, related information of the event may be negotiated by the users in advance in any manner, and then a user drafts the descriptive information of the event, so that other users of the event can view and verify the descriptive information according to the prior negotiation result. In some embodiments, the drafting user may also autonomously determine other users of the event and the content in the descriptive information without negotiation in advance. This is not limited in the specification.

In some embodiments, the descriptive information of the event may comprise a variable represented as a ciphertext. For example, when a plaintext of the variable is t1, a Pedersen commitment mechanism may be used to generate a corresponding ciphertext commitment T1 based on the plaintext t1 and a random number r1. The descriptive information may include T1, t1, and r1, so that another user of the event can verify a correspondence between the ciphertext commitment T1 and the plaintext t1 as well as the random number r1. Encryption protection may be performed on the plaintext t1 and the random number r1 in the descriptive information. For example, when the descriptive information may be sent to a user X, the plaintext t1 and the random number r1 may be encrypted as Enc_X(t1) and Enc_X(r1) by using an identity public key corresponding to a digital identity of the user X. Both Enc_X(t1) and Enc_X(r1) may be added to the descriptive information to be sent to the user X. Thereafter, the user X can decrypt Enc_X(t1) and Enc_X(r1) by using its identity private key to obtain the plaintext t1 and the random number r1. In addition to a public key encryption manner, any other encryption mechanisms, such as digital envelope, may be used. It is not limited in the specification.

In some embodiments, when there is a plurality of users involved in the event other than the user generating the descriptive information, the descriptive information may include encrypted data corresponding to each of the other users. For example, when the event also involves a user X and a user Y besides the user generating the descriptive information, a plaintext t1 and a random number r1 may be encrypted according to an identity public key of the user X to obtain Enc_X(t1) and Enc_X(r1); the plaintext t1 and the random number r1 may be encrypted according to an identity public key of the user Y to obtain Enc_Y(t1) and Enc_Y(r1); and Enc_X(t1), Enc_X(r1), Enc_Y(t1), and Enc_Y(r1) may be all added to the descriptive information, so that one piece of descriptive information may be generated and sent to all the other users. In some embodiments, the user may prepare different descriptive information for each of the other users. For example, descriptive information sent to the user X includes Enc_X(t1) and Enc_X(r1), and descriptive information sent to the user Y includes Enc_Y(t1) and Enc_Y(r1). This is not limited in the specification.

In some embodiments, the user may include a first proof information for the variable included in the descriptive information. The value of the variable may be a ciphertext. The first proof information is used for proving that the value of the variable is in a correct numerical range. In some embodiments, if the event increases the value of the state parameter according to the variable, the first proof information can be used for proving that the increase in the value is in a correct numerical range, and a user (including the user or any other users) may not generate another proof information when generating the corresponding triggering information. In some embodiments, if the event decreases the value of the state parameter corresponding to the user according to the variable, the triggering information generated by the user may include second proof information. The second proof information is used for proving that the value of the state parameter corresponding to the user is not less than the decrease in the value. The first proof information can already prove that the decrease in the value (where the decrease in the value is equal to the value of the variable) is in the correct numerical range.

In some embodiments, no matter whether the descriptive information includes the first proof information or not (especially when the description information does not include the first proof information), if the event increases the value of the state parameter corresponding to a user according to the variable, the user may add third proof information to the triggering information. The third proof information is used for proving that the increase in the value is in a correct numerical range. In some embodiments, if the event decreases the value of the state parameter corresponding to the user according to the variable, the triggering information generated by the user may include fourth proof information. The fourth proof information is used for proving that the decrease in the value is in the correct numerical range, and that the value of the state parameter corresponding to the user is not less than the decrease in the value.

In some embodiments, when the event includes a transfer event, users of the event include: a remitter and a recipient; the variable includes: a transfer amount; and the state parameter includes: an account balance. The transfer event may include performing a transfer operation from the remitter to the recipient, so that an account balance of the remitter is decreased by a corresponding transfer amount, and an account balance of the recipient is increased by the corresponding transfer amount. For example, the descriptive information may include an account address of the remitter, an account address of the recipient, a transfer amount (commitment value), a transfer amount plaintext (in an encrypted state), a random number (in an encrypted state), and the like, so as to indicate that the transfer amount is transferred from the account address of the remitter to the account address of the recipient.

In some embodiments, when the event includes a remittance event, users of the event include: a remitter, a relay, and a recipient; the variable includes: a first transfer amount of a first-type asset between the remitter and the relay, and a second transfer amount of a second-type asset between the relay and the recipient; and the state parameter includes: an account balance. The remittance event may include transferring a first-type asset (such as HKD) between the remitter and the relay, with an asset amount being a first transfer amount, and transferring a second-type asset (such as USD) between the relay and the recipient, with an asset amount being a second transfer amount. Moreover, according to an exchange rate between the first-type asset and the second-type asset, asset values corresponding to the first transfer amount and the second transfer amount are made substantially the same; therefore, the account balance of the remitter is decreased by the first transfer amount (the first-type asset), the account balance of the recipient is increased by the second transfer amount (the second-type asset), and the account balance of the relay is increased by the first transfer amount (the first-type asset) and decreased by the second transfer amount (the second-type asset), which is equivalent to no change in terms of the asset value.

In some embodiments, when the event includes a remittance event involving one or more relays, users of the event include: a remitter, n relays, and a recipient, where n is an integer no less than 1; the variable includes: a transfer amount of a first-type asset between the remitter and the first relay, a transfer amount of an $i^{th}$-type asset between an $(i-1)^{th}$ relay and an $i^{th}$ relay, and a transfer amount of an $(n+1)^{th}$-type asset between an $n^{th}$ relay and the recipient; and the state parameter includes: an account balance, where $1<i\leq n$ and n is an integer. When n=1, the second remittance event is equivalent to the first remittance event in the foregoing embodiment, and details are not described herein again. When n>1, because there is a plurality of relays, compared with the first remittance event in the foregoing embodiment, the second remittance event further includes an asset transfer process between relays. Using n=2 as an example, users of the event include a remitter, a relay 1, a relay 2, and a recipient. A first-type asset (such as HKD) is transferred between the remitter and the relay 1, with the asset amount being a first transfer amount; a second-type asset (such as EUR) is transferred between the relay 1 and the relay 2, with the asset amount being a second transfer amount; a third-type asset (such as USD) is transferred between the relay 2 and the recipient, with the asset amount being a third transfer amount. Moreover, according to an exchange rate 1 between the first-type asset and the second-type asset, and an exchange rate 2 between the second-type asset and the third-type asset, asset values corresponding to the first transfer amount, the second transfer amount, and the third transfer amount are made substantially the same. As a result, the account balance of the remitter is decreased by the first transfer amount (the first-type asset); the account balance of the recipient is increased by the third transfer amount (the third-type asset); the account balance of the relay 1 is increased by the first transfer amount (the first-type asset) and decreased by the second transfer amount (the second-type asset), which is equivalent to no change in terms of the asset value; the account balance of the relay 2 is increased by the second transfer amount (the second-type asset) and decreased by the third transfer amount (the third-type asset), which is equivalent to no change in terms of the asset value.

In some embodiments, the triggering information includes: the descriptive information and a confirmation generated by the user submitting the triggering information. The confirmation indicates that the user submitting the triggering information has verified the descriptive information. Verifying the descriptive information is equivalent to verifying the corresponding event. A blockchain node may use the descriptive information as a unique identifier corresponding to the event, to determine the event corresponding to the triggering information or corresponding to the confirmation included in the triggering information. For example, the confirmation may include: signature information generated for the descriptive information by the user, who submits the triggering information, through an identity private key of the user; alternatively, other forms of confirmation may be used, which are not limited in the specification.

Step 106: submitting, by the computing device of the user, triggering information associated with the user corresponding to the event to the blockchain for the blockchain to process the event according to the descriptive information after verifying all triggering information submitted by the plurality of users.

In some embodiments, the user may submit the descriptive information to other users of the event to verify the content of the descriptive information. Each user may separately submit triggering information for the event to the blockchain, so that each user may asynchronously perform a triggering operation (that is, submits the triggering information), instead of implementing triggering operations by one user in a centralized manner. Therefore, processing load can be shared to prevent a single user from taking excessively high processing load. Moreover, each user can selectively process events that the user is involved in or even process events in batches according to an actual condition (such as processing load, and priority management) of the user.

In some embodiments, the user may add the triggering information to a waiting queue as a to-be-submitted transaction, select several to-be-submitted transactions from the waiting queue according to a preset rule, and cluster the to-be-submitted transactions into a merged transaction. Then, the user may submit the merged transaction to the blockchain, so that each to-be-submitted transaction in the merged transaction is separately processed in the blockchain. The users of the event may separately implement triggering operations, so that each user can separately process, in batches, events that the user is involved in, thereby reducing the quantity of transactions submitted to the blockchain. The preset rule may include any predefined rule, which is not limited in the specification. For example, transactions may be selected according to a preset cycle, and upon arrival of a selection moment in each cycle, all to-be-submitted transactions in the waiting queue may be selected. In another example, transactions may be selected according to a preset quantity, and each time the quantity of to-be-submitted transactions in the waiting queue reaches the preset value, the preset quantity of the to-be-submitted transactions in the waiting queue may be selected. In some embodiments, if only one to-be-submitted transaction is selected based on a preset rule, the merged transaction is equivalent to the to-be-submitted transaction (the clustering operation may be omitted in this case). Similarly, each user of the event may maintain a waiting queue and generate and submit a merged transaction in the foregoing manner, and details are not described herein again.

In some embodiments, the user may tag a number to each merged transaction according to a generating sequence, so that merged transactions are sequentially processed in the blockchain according to the corresponding numbers. After execution of each transaction, the state parameter of the user may change, and execution of a later transaction may depend on the value of the state parameter after execution of a prior transaction. Therefore, the merged transactions may be sequentially processed according to the corresponding numbers, so that each merged transaction can be correctly executed. Similarly, any other users of the event may number the generated merged transactions in the foregoing manner, and details are not described herein again.

In some embodiments, the user may update the value of the state parameter according to another event that the user is involved in and generate the triggering information according to the state parameter with the updated value. For example, when the value of the state parameter and the variable are ciphertexts, and the event decreases the value of the state parameter corresponding to the user according to the variable, a related proof may be provided to ensure that the value of the state parameter is not less than the decrease in the value (where the decrease in the value is equal to the value of the variable). Therefore, the user may determine the value of the state parameter according to a previously processed transaction in order to generate correct proof information to ensure that the related event can be executed smoothly. Similarly, each user of the event may update the value of the state parameter corresponding thereto, to ensure the validity of the generated triggering information. Details are not described herein again.

In some embodiments, after receiving a merged transaction submitted by the user, the blockchain node extracts the to-be-submitted transactions in the merged transaction and verifies the triggering information in the to-be-submitted transactions. When all users of an event have submitted corresponding triggering information, and all the triggering information has passed verification, the event may be marked as in a success state; similarly, the event may be marked as in a failure state if any of the triggering information does not pass verification, and the event may be marked as in a timeout state if any of the triggering information sent by all users is not received within a valid time period. Then, the state of each event is submitted to the blockchain. Using any user of the event as an example, before submitting a merged transaction, the user may query transaction records on a blockchain ledger to determine the state of each event that the user is involved in. For example, for an event in a failure state or a timeout state, the value of the state parameter may be recovered correspondingly (for example, when the user is a remitter, the corresponding account balance may be rolled back). For an event in a success state, the state parameter may be updated (for example, when the user is a recipient, the corresponding transfer amount may be collected and added to the account balance); then proof information of the related event may be generated according to an updated value of the state parameter (it is ensured that the proof information may be generated based on the latest value of the state parameter), and then the merged transaction is generated and submitted.

Figure 2:
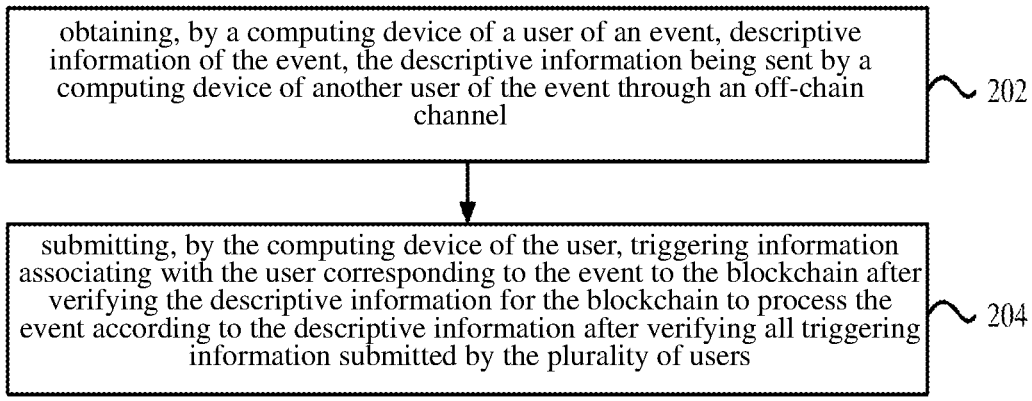
FIG. 2 is a flowchart of another blockchain-based event processing method according to some embodiments.

FIG. 2 is a flowchart of another blockchain-based event processing method according to some embodiments. As shown in FIG. 2, the method is implementable by a user (any user of the event other than the user generating the descriptive information shown in FIG. 1), and the method may include the following steps.

Step 202: obtaining, by a computing device of a user, descriptive information of the event, the descriptive information being sent by another user involved in the event through an off-chain channel.

In some embodiments, an event may involve a plurality of users, and each user may correspond to a participation object. The participation object may be an individual, an enterprise, an organization, and the like, which is not limited in the specification. The participation object has a corresponding digital identity, so that an electronic device carrying the digital identity is equivalent to being configured as a user corresponding to the participation object.

In some embodiments, the event in the specification may include any type of event or scenario including, for example, voting, signing an agreement, flow distribution, transfer, and cross-border remittance, which are not limited in the specification. Using voting as an example, the descriptive information may include information such as a voting subject and voting options, and triggering information submitted by each user to the blockchain may include a voting option selection result, thereby triggering implementation of a voting operation.

In some embodiments, the descriptive information of the event may include a variable, and the event may change a state parameter recorded on the blockchain associated with each of the plurality users according to the variable. For example, the value may be increased, or decreased. The state parameter may also be different according to a different type of the event or a different scenario. For example, in a transfer or a cross-border remittance scenario, the state parameter may be an account balance of the user. In another example, in a flow distribution scenario, the state parameter may be the amount of remaining flow held by the user, which is not limited in the specification.

In some embodiments, the value of the state parameter corresponding to each user and the variable may be plaintexts. Each blockchain node in the blockchain maintains a blockchain ledger, and the blockchain ledger records full transaction data, so that a blockchain node can obtain the value of the state parameter corresponding to each user. Further, the user may submit a transaction to the blockchain, where the transaction includes the triggering information. After reaching a consensus, the transaction can be executed based on the value of the state parameter corresponding to the user and the variable, e.g., changing the value of the state parameter according to the variable.

In some embodiments, the value of the state parameter corresponding to each user and the variable are each a ciphertext calculated based on a homomorphic encryption algorithm or a homomorphic commitment algorithm. For the homomorphic encryption algorithm, any type of homomorphic encryption algorithm can be used, provided that the homomorphic encryption algorithm can satisfy addition homomorphism, so that the value of the state parameter can be increased or decreased according to the variable even in a ciphertext state. Whether the homomorphic encryption algorithm is an addition homomorphic encryption algorithm, or a fully homomorphic encryption algorithm is not limited in the specification. As to the homomorphic commitment algorithm, some embodiments may adopt Pedersen commitment mechanism, which determines a random number, calculates a corresponding commitment data based on the random number and unencrypted data (e.g., the plaintext of the state parameter or the variable), and uses the corresponding commitment data as the ciphertext.

In some embodiments, when the value of the state parameter and the variable are ciphertexts, the user may provide related proof information for blockchain nodes to validate when executing the corresponding transaction. For example, the user may provide a proof indicating that the value of the variable is in a correct numerical range, e.g., $[0,2^{64})$. In another example, when the event decreases the value of the state parameter according to the variable, the user may provide a proof indicating the value of the state parameter is not less than the decrease in the value (where the decrease in the value is equal to the value of the variable).

In some embodiments, a range proof technique, such as a Bulletproofs scheme or a Borromean ring signature scheme, may be used to generate the foregoing proof information. This is not limited by embodiments of the specification.

In some embodiments, the descriptive information may be efficiently transferred to another user of the event through an off-chain channel. The off-chain channel may be an encrypted channel or secure channels in other forms established between users of the event, to prevent information leakage.

In some embodiments, the descriptive information is generated by the user of the event to describe the event. The descriptive information is sent to another user of the event for the another user to verify the descriptive information, thereby determine whether the event is allowed to be executed. The descriptive information may comprise execution logic of the related event, users involved, how the state parameter of each of the involved users is changed (for example, the value of the state parameter is increased or decreased), a variable, any other suitable information, or any combination thereof. In fact, related information of the event may be negotiated by the users in advance in any manner, and then a user drafts the descriptive information of the event, so that other users of the event can view and verify the descriptive information according to the prior negotiation result. In some embodiments, the drafting user may also autonomously determine other users of the event and the content in the descriptive information without negotiation in advance. This is not limited in the specification.

In some embodiments, the descriptive information of the event may comprise a variable represented as a ciphertext. For example, when a plaintext of the variable is t1, a Pedersen commitment mechanism may be used to generate a corresponding ciphertext commitment T1 based on the plaintext t1 and a random number r1. The descriptive information may include T1, t1, and r1, so that another user of the event can verify a correspondence between the ciphertext commitment T1 and the plaintext t1 as well as the random number r1. Encryption protection may be performed on the plaintext t1 and the random number r1 in the descriptive information. For example, when the descriptive information may be sent to a user X, the plaintext t1 and the random number r1 may be encrypted as $Enc\_X(t1)$ and $Enc\_X(r1)$ by using an identity public key corresponding to a digital identity of the user X. Both $Enc\_X(t1)$ and $Enc\_X(r1)$ may be added to the descriptive information to be sent to the user X. Thereafter, the user X can decrypt $Enc\_X(t1)$ and $Enc\_X(r1)$ by using its identity private key to obtain the plaintext t1 and the random number r1. In addition to a public key encryption manner, any other encryption mechanisms, such as digital envelope, may be used. It is not limited in the specification.

In some embodiments, when there is a plurality of users involved in the event other than the user generating the descriptive information, the descriptive information may include encrypted data corresponding to each of the other users. For example, when the event also involves a user X and a user Y besides the user generating the descriptive information, a plaintext t1 and a random number r1 may be encrypted according to an identity public key of the user X to obtain $Enc\_X(t1)$ and $Enc\_X(r1)$; the plaintext t1 and the random number r1 may be encrypted according to an identity public key of the user Y to obtain $Enc\_Y(t1)$ and $Enc\_Y(r1)$; and $Enc\_X(t1)$, $Enc\_X(r1)$, $Enc\_Y(t1)$, and $Enc\_Y(r1)$ may be all added to the descriptive information, so that one piece of descriptive information may be generated and sent to all the other users. In some embodiments, the user may prepare different descriptive information for each of the other users. For example, descriptive information sent to the user X includes $Enc\_X(t1)$ and $Enc\_X(r1)$, and descriptive information sent to the user Y includes $Enc\_Y(t1)$ and $Enc\_Y(r1)$. This is not limited in the specification.

In some embodiments, the user may include a first proof information for the variable included in the descriptive information. The value of the variable may be a ciphertext. The first proof information is used for proving that the value of the variable is in a correct numerical range. In some embodiments, if the event increases the value of the state parameter according to the variable, the first proof information can be used for proving that the increase in the value is in a correct numerical range, and a user (including the user or any other users) may not generate another proof information when generating the corresponding triggering information. In some embodiments, if the event decreases the value of the state parameter corresponding to the user according to the variable, the triggering information generated by the user may include second proof information. The second proof information is used for proving that the value of the state parameter corresponding to the user is not less than the decrease in the value. The first proof information can already prove that the decrease in the value (where the decrease in the value is equal to the value of the variable) is in the correct numerical range.

In some embodiments, no matter whether the descriptive information includes the first proof information or not (especially when the description information does not include the first proof information), if the event increases the value of the state parameter corresponding to the user according to the variable, the user may add third proof information to the triggering information. The third proof information is used for proving that the increase in the value is in a correct numerical range. In some embodiments, if the event decreases the value of the state parameter corresponding to the user according to the variable, the triggering information generated by the user may include fourth proof information. The fourth proof information is used for proving that the decrease in the value is in the correct numerical range, and that the value of the state parameter corresponding to the user is not less than the decrease in the value.

In some embodiments, when the event includes a transfer event, users of the event include: a remitter and a recipient; the variable includes: a transfer amount; and the state parameter includes: an account balance. The transfer event may include performing a transfer operation from the remitter to the recipient, so that an account balance of the remitter is decreased by a corresponding transfer amount, and an account balance of the recipient is increased by the corresponding transfer amount. For example, the descriptive information may include an account address of the remitter, an account address of the recipient, a transfer amount (commitment value), a transfer amount plaintext (in an encrypted state), a random number (in an encrypted state), and the like, so as to indicate that the transfer amount is transferred from the account address of the remitter to the account address of the recipient.

In some embodiments, when the event includes a remittance event, users of the event include: a remitter, a relay, and a recipient; the variable includes: a first transfer amount of a first-type asset between the remitter and the relay, and a second transfer amount of a second-type asset between the relay and the recipient; and the state parameter includes: an account balance. The remittance event may include transferring a first-type asset (such as HKD) between the remitter and the relay, with an asset amount being a first transfer amount, and transferring a second-type asset (such as USD) between the relay and the recipient, with an asset amount being a second transfer amount. Moreover, according to an exchange rate between the first-type asset and the second-type asset, asset values corresponding to the first transfer amount and the second transfer amount are made substantially the same; therefore the account balance of the remitter is decreased by the first transfer amount (the first-type asset), the account balance of the recipient is increased by the second transfer amount (the second-type asset), and the account balance of the relay is increased by the first transfer amount (the first-type asset) and decreased by the second transfer amount (the second-type asset), which is equivalent to no change in terms of the asset value.

In some embodiments, when the event includes a remittance event involving more than one relays, users of the event include: a remitter, n relays, and a recipient; the variable includes: a transfer amount of a first-type asset between the remitter and the first relay, a transfer amount of an $i^{th}$-type asset between an $(i-1)^{th}$ relay and an $i^{th}$ relay, and a transfer amount of an $(n+1)^{th}$-type asset between an $n^{th}$ relay and the recipient; and the state parameter includes: an account balance, where $1<i\leq n$. When n=1, the second remittance event is equivalent to the first remittance event in the foregoing embodiment, and details are not described herein again. When n>1, because there is a plurality of relays, compared with the first remittance event in the foregoing embodiment, the second remittance event further includes an asset transfer process between relays. Using n=2 as an example, users of the event include a remitter, a relay 1, a relay 2, and a recipient. A first-type asset (such as HKD) is transferred between the remitter and the relay 1, with the asset amount being a first transfer amount; a second-type asset (such as EUR) is transferred between the relay 1 and the relay 2, with the asset amount being a second transfer amount; a third-type asset (such as USD) is transferred between the relay 2 and the recipient, with the asset amount being a third transfer amount. Moreover, according to an exchange rate 1 between the first-type asset and the second-type asset, and an exchange rate 2 between the second-type asset and the third-type asset, asset values corresponding to the first transfer amount, the second transfer amount, and the third transfer amount are made substantially the same. As a result, the account balance of the remitter is decreased by the first transfer amount (the first-type asset); the account balance of the recipient is increased by the third transfer amount (the third-type asset); the account balance of the relay 1 is increased by the first transfer amount (the first-type asset) and decreased by the second transfer amount (the second-type asset), which is equivalent to no change in terms of the asset value; the account balance of the relay 2 is increased by the second transfer amount (the second-type asset) and decreased by the third transfer amount (the third-type asset), which is equivalent to no change in terms of the asset value.

Step 204: submitting, by the computing device of the user, triggering information associated with the user corresponding to the event to the blockchain after verifying the descriptive information for the blockchain to process the event according to the descriptive information after verifying all triggering information submitted by the plurality of users.

In some embodiments, the triggering information includes: the descriptive information and a confirmation generated by the user submitting the triggering information. The confirmation indicates that the user submitting the triggering information has verified the descriptive information. Verifying the descriptive information is equivalent to verifying the corresponding event. A blockchain node may use the descriptive information as a unique identifier corresponding to the event, to determine the event corresponding to the triggering information or corresponding to the confirmation included in the triggering information. For example, the confirmation may include: signature information generated for the descriptive information by the user, who submits the triggering information, through an identity private key of the user; alternatively, other forms of confirmation may be used, which are not limited in the specification.

In some embodiments, the user may submit the descriptive information to other users of the event to verify the content of the descriptive information. Each user may separately submit triggering information for the event to the blockchain, so that each user may asynchronously perform a triggering operation (that is, submits the triggering information), instead of implementing triggering operations by one user in a centralized manner. Therefore, processing load can be shared to prevent a single user from taking excessively high processing load. Moreover, each user can selectively process events that the user is involved in or even process events in batches according to an actual condition (such as processing load, and priority management) of the user.

In some embodiments, the user may add the triggering information to a waiting queue as a to-be-submitted transaction, select several to-be-submitted transactions from the waiting queue according to a preset rule, and cluster the to-be-submitted transactions into a merged transaction. Then, the user may submit the merged transaction to the blockchain, so that each to-be-submitted transaction in the merged transaction is separately processed in the blockchain. The users of the event may separately implement triggering operations, so that each user can separately process, in batches, events that the user is involved in, thereby reducing the quantity of transactions submitted to the blockchain. The preset rule may include any predefined rule, which is not limited in the specification. For example, transactions may be selected according to a preset cycle, and upon arrival of a selection moment in each cycle, all to-be-submitted transactions in the waiting queue may be selected. In another example, transactions may be selected according to a preset quantity, and each time the quantity of to-be-submitted transactions in the waiting queue reaches the preset value, the preset quantity of the to-be-submitted transactions in the waiting queue may be selected. In some embodiments, if only one to-be-submitted transaction is selected based on a preset rule, the merged transaction is equivalent to the to-be-submitted transaction (the clustering operation may be omitted in this case). Similarly, each user of the event may maintain a waiting queue, generate and submit a merged transaction in the foregoing manner, and details are not described herein again.

In some embodiments, the user may tag a number to each merged transaction according to a generating sequence, so that merged transactions are sequentially processed in the blockchain according to the corresponding numbers. After execution of each transaction, the state parameter of the user may change, and execution of a later transaction may depend on the value of the state parameter after execution of a prior transaction. The merged transactions may be sequentially processed according to the corresponding numbers, so that each merged transaction can be correctly executed. Similarly, any other users of the event may number the generated merged transactions in the foregoing manner, and details are not described herein again.

In some embodiments, the user may update the value of the state parameter according to another event that the user is involved in and generate the triggering information according to the state parameter with the updated value. For example, when the value of the state parameter and the variable are ciphertexts, and the event decreases the value of the state parameter corresponding to the user according to the variable, a related proof may be provided to ensure that the value of the state parameter is not less than the decrease in the value (where the decrease in the value is equal to the value of the variable). Therefore, the user may determine the value of the state parameter according to a previously processed transaction in order to generate correct proof information to ensure that the related event can be executed smoothly. Similarly, each user of the event may update the value of the state parameter corresponding thereto, to ensure the validity of the generated triggering information. Details are not described herein again.

In some embodiments, after receiving a merged transaction submitted by the user, the blockchain node extracts the to-be-submitted transactions in the merged transaction and verifies the triggering information in the to-be-submitted transactions. When all users of an event have submitted corresponding triggering information, and all the triggering information has passed verification, the event may be marked as in a success state; similarly, the event may be marked as in a failure state if any of the triggering information does not pass verification, and the event may be marked as in a timeout state if any of the triggering information sent by all users is not received within a valid time period. Then, the state of each event is submitted to the blockchain. Using any user of the event as an example, before submitting a merged transaction, the user may query transaction records on a blockchain ledger to determine the state of each event that the user is involved in. For example, for an event in a failure state or a timeout state, the value of the state parameter may be recovered correspondingly (for example, when the user is a remitter, the corresponding account balance may be rolled back). For an event in a success state, the state parameter may be updated (for example, when the user is a recipient, the corresponding transfer amount may be collected and added to the account balance); then proof information of the related event may be generated according to an updated value of the state parameter (it is ensured that the proof information is generated based on the latest value of the state parameter), and then the merged transaction may be generated and submitted.

Figure 3:
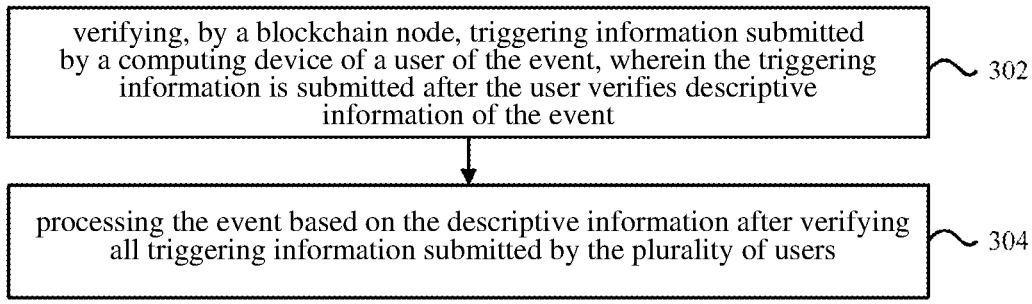
FIG. 3 is a flowchart of yet another blockchain-based event processing method according to some embodiments.

FIG. 3 is a flowchart of yet another blockchain-based event processing method according to some embodiments. As shown in FIG. 3, the method is implementable by a blockchain node and may include the following steps.

Step 302: verifying, by a blockchain node, triggering information submitted by a user of the event, wherein the triggering information is submitted by the user to the blockchain after verifying descriptive information of the event.

In some embodiments, an event may involve a plurality of users, and each user may correspond to a participation object. The participation object may be an individual, an enterprise, an organization, and the like, which is not limited in the specification. The participation object has a corresponding digital identity, so that an electronic device carrying the digital identity is equivalent to being configured as a user corresponding to the participation object.

In some embodiments, the event in the specification may include any type of event or scenario including, for example, voting, signing an agreement, flow distribution, transfer, and cross-border remittance, which are not limited in the specification. Using voting as an example, the descriptive information may include information such as a voting subject and voting options, and triggering information submitted by each user to the blockchain may include a voting option selection result, thereby triggering implementation of a voting operation.

In some embodiments, the descriptive information of the event may include a variable, and the event may change a state parameter recorded on the blockchain associated with each of the plurality users according to the variable. For example, the value may be increased, or decreased. The state parameter may also be different according to a different type of the event or a different scenario. For example, in a transfer or a cross-border remittance scenario, the state parameter may be an account balance of the user. In another example, in a flow distribution scenario, the state parameter may be the amount of remaining flow held by the user, which is not limited in the specification.

In some embodiments, the value of the state parameter corresponding to each user and the variable may be plaintexts. Each blockchain node in the blockchain maintains a blockchain ledger, and the blockchain ledger records full transaction data, so that a blockchain node can obtain the value of the state parameter corresponding to each user. Further, the user may submit a transaction to the blockchain, where the transaction includes the triggering information. After reaching a consensus, the transaction can be executed based on the value of the state parameter corresponding to the user and the variable, e.g., changing the value of the state parameter according to the variable.

In some embodiments, the value of the state parameter corresponding to each user and the variable are each a ciphertext calculated based on a homomorphic encryption algorithm or a homomorphic commitment algorithm. For the homomorphic encryption algorithm, any type of homomorphic encryption algorithm can be used, provided that the homomorphic encryption algorithm can satisfy addition homomorphism, so that the value of the state parameter can be increased or decreased according to the variable even in a ciphertext state. Whether the homomorphic encryption algorithm is an addition homomorphic encryption algorithm, or a fully homomorphic encryption algorithm is not limited in the specification. As to the homomorphic commitment algorithm, some embodiments may adopt Pedersen commitment mechanism, which determines a random number, calculates a corresponding commitment data based on the random number and unencrypted data (e.g., the plaintext of the state parameter or the variable). The commitment data can be used as the ciphertext.

In some embodiments, when the value of the state parameter and the variable are ciphertexts, the user may provide related proof information for blockchain nodes to validate when executing the corresponding transaction. For example, the user may provide a proof indicating that the value of the variable is in a correct numerical range, e.g., $[0,2^{64})$. In another example, when the event decreases the value of the state parameter according to the variable, the user may provide a proof indicating the value of the state parameter is not less than the decrease in the value (where the decrease in the value is equal to the value of the variable).

In some embodiments, a range proof technique, such as a Bulletproofs scheme or a Borromean ring signature scheme, may be used to generate the foregoing proof information. This is not limited by embodiments of the specification.

In some embodiments, the descriptive information may be efficiently transferred to another user of the event through an off-chain channel. The off-chain channel may be an encrypted channel or secure channels in other forms established between users of the event, to prevent information leakage.

In some embodiments, the descriptive information is generated by the user of the event to describe the event. The descriptive information is sent to another user of the event for the another user to verify the descriptive information, thereby determine whether the event is allowed to be executed. The descriptive information may comprise execution logic of the related event, users involved, how the state parameter of each of the involved users is changed (for example, the value of the state parameter is increased or decreased), a variable, any other suitable information, or any combination thereof. In fact, related information of the event may be negotiated by the users in advance in any manner, and then a user drafts the descriptive information of the event, so that other users of the event can view and verify the descriptive information according to the prior negotiation result. In some embodiments, the drafting user may also autonomously determine other users of the event and the content in the descriptive information without negotiation in advance. This is not limited in the specification.

In some embodiments, the descriptive information of the event may comprise a variable represented as a ciphertext. For example, when a plaintext of the variable is t1, a Pedersen commitment mechanism may be used to generate a corresponding ciphertext commitment T1 based on the plaintext t1 and a random number r1. The descriptive information may include T1, t1, and r1, so that another user of the event can verify a correspondence between the ciphertext commitment T1 and the plaintext t1 as well as the random number r1. Encryption protection may be performed on the plaintext t1 and the random number r1 in the descriptive information. For example, when the descriptive information may be sent to a user X, the plaintext t1 and the random number r1 may be encrypted as Enc_X(t1) and Enc_X(r1) by using an identity public key corresponding to a digital identity of the user X. Both Enc_X(t1) and Enc_X(r1) may be added to the descriptive information to be sent to the user X. Thereafter, the user X can decrypt Enc_X(t1) and Enc_X(r1) by using its identity private key to obtain the plaintext t1 and the random number r1. In addition to a public key encryption manner, any other encryption mechanisms, such as digital envelope, may be used. It is not limited in the specification.

In some embodiments, when there is a plurality of users involved in the event other than the user generating the descriptive information, the descriptive information may include encrypted data corresponding to each of the other users. For example, when the event also involves a user X and a user Y besides the user generating the descriptive information, a plaintext t1 and a random number r1 may be encrypted according to an identity public key of the user X to obtain Enc_X(t1) and Enc_X(r1); the plaintext t1 and the random number r1 may be encrypted according to an identity public key of the user Y to obtain Enc_Y(t1) and Enc_Y(r1); and Enc_X(t1), Enc_X(r1), Enc_Y(t1), and Enc_Y(r1) may be all added to the descriptive information, so that one piece of descriptive information may be generated and sent to all the other users. In some embodiments, the user may prepare different descriptive information for each of the other users. For example, descriptive information sent to the user X includes Enc_X(t1) and Enc_X(r1), and descriptive information sent to the user Y includes Enc_Y(t1) and Enc_Y(r1). This is not limited in the specification.

In some embodiments, the user may include a first proof information for the variable included in the descriptive information. The value of the variable may be a ciphertext. The first proof information is used for proving that the value of the variable is in a correct numerical range. In some embodiments, if the event increases the value of the state parameter according to the variable, the first proof information can be used for proving that the increase in the value is in a correct numerical range, and a user (including the user or any other users) may not generate another proof information when generating the corresponding triggering information. In some embodiments, if the event decreases the value of the state parameter corresponding to the user according to the variable, the triggering information generated by the user may include second proof information. The second proof information is used for proving that the value of the state parameter corresponding to the user is not less than the decrease in the value. The first proof information can already prove that the decrease in the value (where the decrease in the value is equal to the value of the variable) is in the correct numerical range.

In some embodiments, no matter whether the descriptive information includes the first proof information or not (especially when the description information does not include the first proof information), if the event increases the value of the state parameter corresponding to the user according to the variable, the user may add third proof information to the triggering information. The third proof information is used for proving that the increase in the value is in a correct numerical range. In some embodiments, if the event decreases the value of the state parameter corresponding to the user according to the variable, the triggering information generated by the user may include fourth proof information. The fourth proof information is used for proving that the decrease in the value is in the correct numerical range, and that the value of the state parameter corresponding to the user is not less than the decrease in the value.

In some embodiments, when the event includes a transfer event, users of the event include: a remitter and a recipient; the variable includes: a transfer amount; and the state parameter includes: an account balance. The transfer event may include performing a transfer operation from the remitter to the recipient, so that an account balance of the remitter is decreased by a corresponding transfer amount, and an account balance of the recipient is increased by the corresponding transfer amount. For example, the descriptive information may include an account address of the remitter, an account address of the recipient, a transfer amount (commitment value), a transfer amount plaintext (in an encrypted state), a random number (in an encrypted state), and the like, so as to indicate that the transfer amount is transferred from the account address of the remitter to the account address of the recipient.

In some embodiments, when the event includes a remittance event, users of the event include: a remitter, a relay, and a recipient; the variable includes: a first transfer amount of a first-type asset between the remitter and the relay, and a second transfer amount of a second-type asset between the relay and the recipient; and the state parameter includes: an account balance. The remittance event may include transferring a first-type asset (such as HKD) between the remitter and the relay, with an asset amount being a first transfer amount, and transferring a second-type asset (such as USD) between the relay and the recipient, with an asset amount being a second transfer amount. Moreover, according to an exchange rate between the first-type asset and the second-type asset, asset values corresponding to the first transfer amount and the second transfer amount are made substantially the same; therefore, the account balance of the remitter is decreased by the first transfer amount (the first-type asset), the account balance of the recipient is increased by the second transfer amount (the second-type asset), and the account balance of the relay is increased by the first transfer amount (the first-type asset) and decreased by the second transfer amount (the second-type asset), which is equivalent to no change in terms of the asset value.

In some embodiments, when the event includes a remittance event involving more than one relays, users of the event include: a remitter, n relays, and a recipient; the variable includes: a transfer amount of a first-type asset between the remitter and the first relay, a transfer amount of an $i^{th}$-type asset between an $i^{th}$-type asset between an $(i-1)^{th}$ relay and an $i^{th}$ relay, and a transfer amount of an $(n+1)^{th}$-type asset between an $n^{th}$ relay and the recipient; and the state parameter includes: an account balance, where 1<i≤n. When n=1, the second remittance event is equivalent to the first remittance event in the foregoing embodiment, and details are not described herein again. When n>1, because there is a plurality of relays, compared with the first remittance event in the foregoing embodiment, the second remittance event further includes an asset transfer process between relays. Using n=2 as an example, users of the event include a remitter, a relay 1, a relay 2, and a recipient. A first-type asset (such as HKD) is transferred between the remitter and the relay 1, with the asset amount being a first transfer amount; a second-type asset (such as EUR) is transferred between the relay 1 and the relay 2, with the asset amount being a second transfer amount; a third-type asset (such as USD) is transferred between the relay 2 and the recipient, with the asset amount being a third transfer amount. Moreover, according to an exchange rate 1 between the first-type asset and the second-type asset, and an exchange rate 2 between the second-type asset and the third-type asset, asset values corresponding to the first transfer amount, the second transfer amount, and the third transfer amount are made substantially the same. As a result, the account balance of the remitter is decreased by the first transfer amount (the first-type asset); the account balance of the recipient is increased by the third transfer amount (the third-type asset); the account balance of the relay 1 is increased by the first transfer amount (the first-type asset) and decreased by the second transfer amount (the second-type asset), which is equivalent to no change in terms of the asset value; the account balance of the relay 2 is increased by the second transfer amount (the second-type asset) and decreased by the third transfer amount (the third-type asset), which is equivalent to no change in terms of the asset value.

In some embodiments, the triggering information includes: the descriptive information and a confirmation generated by the user submitting the triggering information. The confirmation indicates that the user submitting the triggering information has verified the descriptive information. Verifying the descriptive information is equivalent to verifying the corresponding event. A blockchain node may use the descriptive information as a unique identifier corresponding to the event, to determine the event corresponding to the triggering information or corresponding to the confirmation included in the triggering information. For example, the confirmation may include: signature information generated for the descriptive information by the user, who submits the triggering information, through an identity private key of the user; alternatively, other forms of confirmation may be used, which are not limited in the specification.

In some embodiments, the blockchain node may receive a merged transaction submitted by the user. The merged transaction may include one or more to-be-submitted transactions that are extracted by the user from a local waiting queue. Triggering information is added to the waiting queue as a to-be-submitted transaction after the user verifies the descriptive information. Each to-be-submitted transaction in the merged transaction is extracted and processed separately. In other words, each user may add the triggering information to a waiting queue as a to-be-submitted transaction, select several to-be-submitted transactions from the waiting queue according to a preset rule, and cluster the to-be-submitted transactions into a merged transaction. Then, the user submits the merged transaction to the blockchain, so that each to-be-submitted transaction in the merged transaction is separately processed by the blockchain node. The users of the event separately implement triggering operations, so that each user can separately process, in batches, events that the user is involved in, thereby reducing the quantity of transactions submitted to the blockchain. The preset rule may include any predefined rule, which is not limited in the specification. For example, transactions may be selected according to a preset cycle, and upon arrival of a selection moment in each cycle, all to-be-submitted transactions in the waiting queue may be selected. In another example, transactions may be selected according to a preset quantity, and each time the quantity of to-be-submitted transactions in the waiting queue reaches the preset value, the preset quantity of the to-be-submitted transactions in the waiting queue may be selected. In some embodiments, if only one to-be-submitted transaction is selected based on a preset rule, the merged transaction is equivalent to the to-be-submitted transaction (the clustering operation may be omitted in this case). Similarly, each user of the event may maintain a waiting queue, generate and submit a merged transaction in the foregoing manner, and details are not described herein again.

In some embodiments, the blockchain node may extract a number associated with the merged transaction, where the number is added by the user according to a generating sequence of the merged transaction; then, the blockchain node sequentially processes received merged transaction according to values of corresponding numbers. In other words, the user may tag a number to each merged transaction according to a generating sequence, so that merged transactions are sequentially processed in the blockchain according to the corresponding numbers. After execution of each transaction, the state parameter of the user may change, and execution of a later transaction may depend on the value of the state parameter after execution of a prior transaction. Therefore, the merged transactions may be sequentially processed according to the corresponding numbers, so that each merged transaction can be correctly executed. Similarly, any other users of the event may number the generated merged transactions in the foregoing manner, and details are not described herein again.

In some embodiments, the user may update the value of the state parameter according to another event that the user is involved in and generate the triggering information according to the state parameter with the updated value. For example, when the value of the state parameter and the variable are ciphertexts, and the event decreases the value of the state parameter corresponding to the user according to the variable, a related proof may to be provided to ensure that the value of the state parameter is not less than the decrease in the value (where the decrease in the value is equal to the value of the variable). Therefore, the user may determine the value of the state parameter according to a previously processed transaction in order to generate correct proof information to ensure that the related event can be executed smoothly. Similarly, each user of the event may update the value of the state parameter corresponding thereto, to ensure the validity of the generated triggering information. Details are not described herein again.

In some embodiments, after receiving a merged transaction submitted by the user, the blockchain node extracts the to-be-submitted transactions in the merged transaction and verifies the triggering information in the to-be-submitted transactions. When all users of an event have submitted corresponding triggering information, and all the triggering information has passed verification, the event may be marked as in a success state; similarly, the event may be marked as in a failure state if any of the triggering information does not pass verification, and the event may be marked as in a timeout state if any of the triggering information sent by all users is not received within a valid time period. Then, the state of each event is submitted to the blockchain. Using any user of the event as an example, before submitting a merged transaction, the user may query transaction records on a blockchain ledger to determine the state of each event that the user is involved in. For example, for an event in a failure state or a timeout state, the value of the state parameter may be recovered correspondingly (for example, when the user is a remitter, the corresponding account balance may be rolled back). For an event in a success state, the state parameter may be updated (for example, when the user is a recipient, the corresponding transfer amount may be collected and added to the account balance); then proof information of the related event may be generated according to an updated value of the state parameter (it is ensured that the proof information is generated based on the latest value of the state parameter), and then the merged transaction may be generated and submitted.

Step 304: processing the event based on the descriptive information after verifying all triggering information submitted by the plurality of users.

In some embodiments, the user may submit the descriptive information to other users of the event to verify the content of the descriptive information. Each user may separately submit triggering information for the event to the blockchain, so that each user may asynchronously perform a triggering operation (that is, submits the triggering information), instead of implementing triggering operations by one user in a centralized manner. Therefore, processing load can be shared to prevent a single user from taking excessively high processing load. Moreover, each user can selectively process events that the user is involved in or even process events in batches according to an actual condition (such as processing load, and priority management) of the user.

In some embodiments, the transaction/event (transfer) described in the specification refers to a piece of data that is created by a user through a client of a blockchain and released to a distributed database of a blockchain. Transactions in the blockchain are classified into transactions in a narrow sense and transactions in a broad sense. A transaction in a narrow sense refers to a value transfer released by a user to the blockchain. For example, in a conventional Bitcoin blockchain network, a transaction may be a transfer initiated by a user in the blockchain. A transaction in a broad sense refers to business data released by a user to the blockchain. For example, an operator may establish a consortium blockchain based on an actual business requirement and deploy some online services of other types irrelevant to value transfer (for example, a house renting service, a vehicle scheduling service, an insurance claim settlement service, a credit service, and a medical service) relying on the consortium blockchain. In such a consortium blockchain, a transaction may be a service message or a service request with a service intention released by a user in the consortium blockchain.

Figure 4:
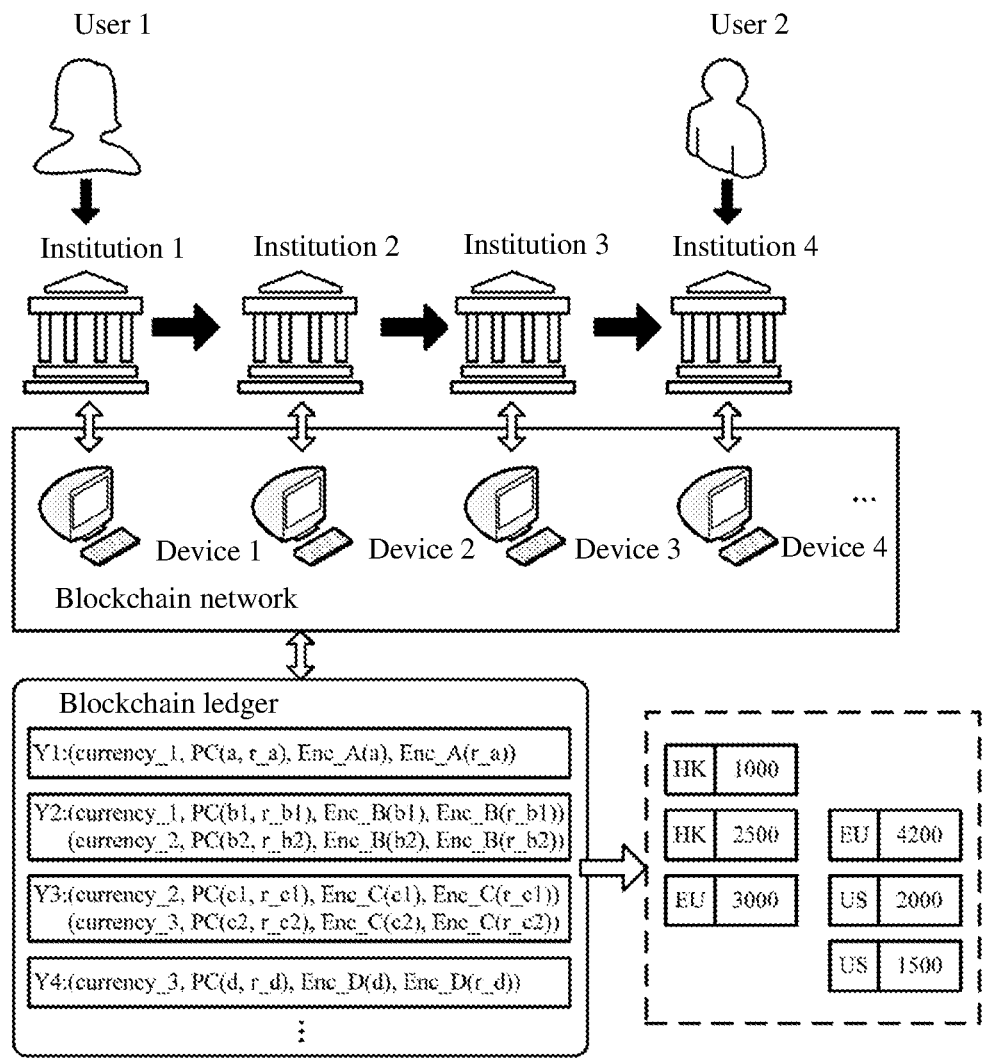
FIG. 4 is a schematic diagram of a cross-border remittance scenario according to some embodiments.

For ease of understanding, some embodiments of the specification are illustrated in the following by using a cross-border remittance scenario as an example. FIG. 4 is a schematic diagram of a cross-border remittance scenario according to some embodiments. As shown in FIG. 4, it is assumed that a user 1 initiates a blockchain remittance to a user 2. The "user" in the specification may be embodied as a user account that is logged into, and the user account may belong to an individual or an organization, which is not limited in the specification. It is assumed that the user 1 opens a client capital account 1 in an institution 1 in a country A, and a user 2 opens a client capital account 2 in an institution 4 in a country B. In the specification, where the cross-border remittance cannot be directly implemented between the institution 1 and the institution 4, the operation of the cross-border remittance can be implemented on the blockchain with the assistance of an institution 2 and an institution 3.

The institution 1, the institution 2, the institution 3, and the institution 4 have corresponding device 1, device 2, device 3, and device 4 respectively, and by running a client program of the blockchain on the devices 1 to 4, the devices 1 to 4 are configured as corresponding blockchain nodes. Correspondingly, the institutions 1 to 4 may implement blockchain-related operations through the devices 1 to 4. For example, the institutions 1 to 4 may submit corresponding blockchain transactions to the blockchain through the devices 1 to 4 respectively. In another example, the devices 1 to 4 each maintain full transaction data on the blockchain, that is, a blockchain ledger, so that the institutions 1 to 4 can separately query and maintain balance data of each blockchain account. For example, a blockchain account Y1 corresponding to the institution 1 holds 1000 HKD, a blockchain account Y2 corresponding to the institution 2 holds 2500 HKD and 4200 EUR, a blockchain account Y3 corresponding to the institution 3 holds 3000 EUR and 2000 USD, and a blockchain account Y4 corresponding to the institution 4 holds 1500 USD.

In consideration of privacy protection and other aspects, the balance data of the blockchain accounts Y1 to Y4 is usually maintained by using corresponding ciphertext data, rather than in a plaintext form. Using the blockchain account Y1 as an example, the blockchain account Y1 may be recorded as (currency_1, PC(a, r_a), Enc_A(a), Enc_A(r_a)) in the blockchain ledger, where currency_1 represents that a currency type is HKD; a represents that the amount of HKD is 1000; r_a is a random number corresponding to a; PC(a, r_a) is a ciphertext-form commitment value calculated from a and r_a through a Pedersen commitment mechanism; Enc_A(a) and Enc_A(r_a) are ciphertexts of a and r_a respectively (for example, an identity public key of the institution 1 may be used for encryption, or any other form of encryption algorithm may be used). The blockchain account Y2 may be recorded as (currency_1, PC(b1, r_b1), Enc_B(b1), Enc_B(r_b1)), (currency_2, PC(b2, r_b2), Enc_B(b2), Enc_B(r_b2)), where b1 represents that the amount of HKD is 2500; r_b1 is a random number corresponding to b1; currency_2 represents that a currency type is EUR; b2 represents that the amount of EUR is 4200; r_b2 is a random number corresponding to b2. The blockchain account Y3 may be recorded as (currency_2, PC(c1, r_c1), Enc_C(c1), Enc_C(r_c1)), (currency_3, PC(c2, r_c2), Enc_C(c2), Enc_C(r_c2)), where c1 represents that the amount of HKD and EUR is 3000; r_c1 is a random number corresponding to c1; currency_3 represents that a currency type is USD; c2 represents that the amount of USD is 2000; r_c2 is a random number corresponding to c2. The blockchain account Y4 may be recorded as (currency_3, PC(d, r_d), Enc_D(d), Enc_D(r_d)), where d represents that the amount of USD is 1500, and r_d is a random number corresponding to d.

Figure 5:
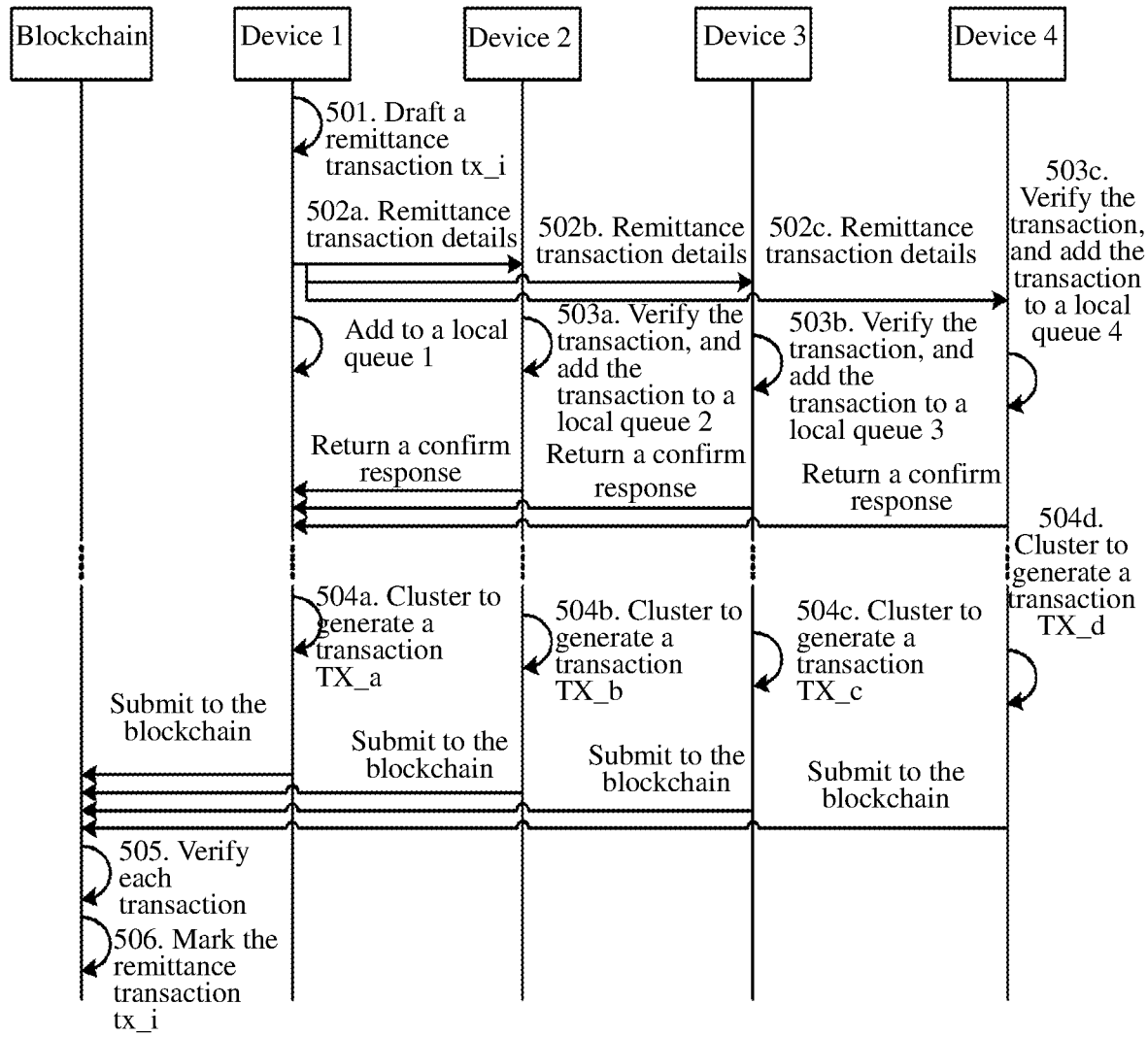
FIG. 5 is a schematic diagram of interaction during a cross-border remittance process according to some embodiments.

Based on the remittance scenario shown in FIG. 4, FIG. 5 is a schematic diagram of interaction during a cross-border remittance process according to some embodiments. As shown in FIG. 5, the interaction process of the cross-border remittance may include the following steps:

Step 501: A device 1 drafts a remittance transaction tx_i.

In some embodiments, it is assumed that a user 1 wants to remit 500 HKD to a user 2. The user 1 may provide 500 HKD through a client capital account 1 in an institution 1, and a user 2 may receive, from a client capital account 2 in an institution 4, US dollars calculated based on an exchange rate.

In some embodiments, the institution 1 may deduct 500 HKD from the client capital account 1 corresponding to the user 1; the institution 1 may determine a remittance route between the institution 1 and the institution 4. For example, the remittance route in FIG. 4 is "institution 1→institution 2→institution 3→institution 4", so that the institution 1 can transfer 500 HKD to the institution 2, and the institution 2 can transfer 56 EUR (which is equivalent to 500 HKD) to the institution 3, and the institution 3 can transfer 64 USD (which is equivalent to 56 EUR or 500 HKD) to the institution 4, and finally the institution 4 transfers 64 USD to the client capital account 2 corresponding to the user 2, thereby completing the remittance operation. Deducting 500 HKD from the client capital account 1 by the institution 1 and transferring 64 USD to the client capital account 2 by the institution 4 may be off-chain operations; on-chain capital transfer from the institution 1 to institution 4 may be implemented through the blockchain.

In some embodiments, in the remittance route "institution 1→institution 2→institution 3→institution 4", there are two relays, namely, the institution 3 and the institution 4, between the institution 1 and the institution 4. In other embodiments, the quantity of relays may be 1, 3 or more than 3, which is not limited in the specification.

For the determined remittance route and the remittance amounts between institutions, the remittance transaction tx_i drafted by the device 1 may include the following remittance transaction details: a transaction id tx_i, an address Z1 of the blockchain account Y1, an address Z2 of the blockchain account Y2, an address Z3 of the blockchain account Y3, an address Z4 of the blockchain account Y4, ciphertext information {(currency_1, PC(t1, r_t1), Enc_B(t1), Enc_B(r_t1), Enc_C(t1), Enc_C(r_t1), Enc_D(t1), Enc_D(r OA (currency_2, PC(t2, r_t2), Enc_B(t2), Enc_B(r_t2), Enc_C(t2), Enc_C(r_t2), Enc_D(t2), Enc_D(r_t2)), (currency_3, PC(t3, r_t3), Enc_B(t3), Enc_B(r_t3), Enc_C(t3), Enc_C(r_t3), Enc_D(t3), Enc_D(r_t3)), rate1, rate2, time, . . . } related to the transaction amounts, range proofs RP_t1, RP_t2, and RP_t3 for the transaction amounts t1, t2, and t3, and the like.

The addresses Z1 to Z4 are used for indicating users of the current remittance event, so that transfer remittance is subsequently performed on the blockchain accounts Y1 to Y4 corresponding to the addresses Z1 to Z4.

In (currency_1, PC(t1, r_t1), Enc_B(t1), Enc_B(r_t1), Enc_C(t1), Enc_C(r_t1), Enc_D(t1), Enc_D(r_t1)), t1 represents a transfer amount (such as 500 HKD described above) from the address Z1 to the address Z2; r_t1 is a random number corresponding to the amount t1; PC(t1,r_t1) is a commitment value calculated based on the amount t1 and the random number r_t1; Enc_B(t1) represents a ciphertext obtained by encrypting the amount t1 by using an identity public key of the institution 2; Enc_C(t1) represents a ciphertext obtained by encrypting the amount t1 by using an identity public key of the institution 3; Enc_D(t1) represents a ciphertext obtained by encrypting the amount t1 by using an identity public key of the institution 4. Similarly, Enc_B(r_t1), Enc_C(r_t1), and Enc_D(r_t1) are respectively ciphertexts obtained by encrypting the amount t1 by using the identity public keys of the institution 2, the institution 3, and the institution 4. Embodiments of (currency_2,PC(t2,r_t2), Enc_B(t2), Enc_B(r_t2), Enc_C(t2), Enc_C(r_t2), Enc_D(t2), Enc_D(r_t2)) and (currency_3,PC (t3,r_t3), Enc_B(t3), Enc_B(r_t3), Enc_C(t3), Enc_C(r_t3), Enc_D(t3), Enc_D(r_t3)) are similar to the foregoing description, and details are not described herein again. Rate1 and rate2 are an exchange rate between currency_1 and currency_2, and an exchange rate between currency_2 and currency_3 respectively. Time represents a transaction moment. There may be some other data required for the transaction, which are not enumerated herein.

RP_t1, RP_t2, and RP_t3 are range proofs corresponding to the transaction amounts t1, t2, and t3 respectively, and are used for proving that the transaction amounts t1, t2, and t3 are in correct numerical ranges, for example, $1 \leq t1 < 2^{64}$, $1 \leq t2 < 2^{64}$, and $1 \leq t3 < 2^{64}$. The device 1 may generate the range proofs through a zero-knowledge proof technique or other suitable technologies, which is not limited in the specification.

In addition to the range proofs RP_t1, RP_t2, and RP_t3 generated by the device 1 for the transaction amounts t1, t2, and t3, each device may also generate a range proof for a transaction amount that the device (which may also be construed as the institution corresponding to the device) may pay. For example, the institution 1 transfers the transaction amount t1 to the institution 2, the institution 2 transfers the transaction amount t2 to the institution 3, and the institution 3 transfers the transaction amount t3 to the institution 4. In this case, the device 1 corresponding to the institution 1 may generate the range proof RP_t1 for the transaction amount t1 and add the range proof RP_t1 to the remittance transaction details of the remittance transaction tx_i, while the range proofs RP_t2 and RP_t3 corresponding to the transaction amounts t2 and t3 are respectively generated by the device 2 and the device 3 corresponding to the institution 2 and the institution 3. For example, after receiving the remittance transaction details of the remittance transaction tx_i sent by the device 1, the device 2 generates the range proof RP_t2 for the transaction amount t2, adds the range proof RP_t2 to the remittance transaction tx_i, and then adds the remittance transaction tx_i to a local queue 2; after receiving the remittance transaction details of the remittance transaction tx_i sent by the device 1, the device 3 generates the range proof RP_t3 for the transaction amount t3, adds the range proof RP_t3 to the remittance transaction tx_i, and then adds the remittance transaction tx_i to a local queue 3.

Steps 502a to 502c: The device 1 signs remittance transaction details by using an identity private key of an institution 1, sends the signed remittance transaction details to devices 2 to 4 through an out-of-chain channel (or referred to as an off-chain channel), and adds the remittance transaction tx_i to a local queue 1 maintained by the device 1.

In some embodiments, the device 1 may perform steps 502a to 502c synchronously or asynchronously, and an execution sequence of the three steps is not limited in the specification. The off-chain channel between the device 1 and the devices 2 to 4 is, for example, an encryption-type secure channel, so as to avoid leakage of the remittance transaction details. Because the transfer amount, the random number, and the like in the remittance transaction details are all in a ciphertext form, information will not be leaked even if the remittance transaction details are stolen.

Step 503a: After verifying the received remittance transaction details, the device 2 adds the remittance transaction details to a local queue 2 thereof and returns a confirm response to the device 1.

In some embodiments, after receiving the remittance transaction details sent by the device 1, the device 2 may perform a verification operation, which includes: the device 2 may verify the signature of the remittance transaction details by using the identity public key of the device 1, to determine that the remittance transaction details are sent by the device 1; the device 2 decrypts $Enc\_B(t1)$, $Enc\_B(r\_t1)$, $Enc\_B(t2)$, $Enc\_B(r\_t2)$, $Enc\_B(t3)$, and $Enc\_B(r\_t3)$ included in the remittance transaction details by using the identity private key of the device 2, to obtain the corresponding amount t1 and random number $r\_t1$, amount t2 and random number $r\_t2$, and amount t3 and random number $r\_t3$, and verify whether $PC(t1, r\_t1)=r\_t1G+t1H$, $PC(t2, r\_t2)=r\_t2G+t2H$, and $PC(t3, r\_t3)=r\_t3G+t3H$ are true (where G and H are public parameters); the device 2 verifies whether an exchange rate between currency_1 and currency_2 is rate1, and whether an exchange rate between currency_2 and currency_3 is rate2; the device 2 verifies whether the range proofs $RP\_t1$, $RP\_t2$, and $RP\_t3$ are correct (it is also possible that only the range proof $RP\_t1$ is included, while the range proof $RP\_t2$ may be generated by the device 2, and the range proof $RP\_t3$ may be generated by the device 3). After determining that the remittance transaction details pass the verification, the device 2 may add the corresponding remittance transaction tx_i to the local queue 2 maintained by the device 2, and return a confirm response to the device 1, to indicate that the corresponding remittance transaction is accepted.

Steps 503b-503c: After verifying the received remittance transaction details, the device 3 and the device 4 separately add the remittance transaction details to local queues 3 and 4 thereof, and return confirm responses to the device 1.

In some embodiments, operations performed by the device 3 and the device 4 are similar to the operation performed by the device 2 and are not described in detail herein again.

Step 504a: The device 1 clusters remittance transactions in the local queue 1 to generate a transaction TX_a, signs the transaction, and then submits the transaction to the blockchain.

The institution 1 may also take part in other remittance transactions similar to the remittance transaction tx_i. For example, when a user may remit to another user through the institution 1, the device 1 may draft a corresponding remittance transaction in a manner similar to the foregoing steps, send remittance transaction details to other institutions for verification, and add the corresponding remittance transaction tx_i to the local queue 1. Meanwhile, the institution 1 may also serve as a relay (similar to the role of the institutions 2 and 3 in the foregoing embodiment) or a recipient (similar to the role of the institution 4 in the foregoing embodiment) of some remittance transactions, so that the institution 1 can receive, through the device 1, remittance transaction details sent by remitters (similar to the role of the institution 1 in the foregoing embodiment) of these remittance transactions, and add the corresponding remittance transactions to the local queue 1 after the remittance transaction details pass verification.

Therefore, the local queue 1 maintained by the device 1 includes many remittance transactions that the institution 1 involved in. The device 1 may select one or more remittance transactions from the local queue 1 each time according to a predefined transaction selection rule, and cluster the selected remittance transactions, to generate a blockchain transaction.

It is assumed that remittance transactions selected by the device 1 at one time include the foregoing remittance transaction tx_i, and a corresponding blockchain transaction TX_a is generated accordingly. The blockchain transaction TX_a includes a sequence number seq and information related to each selected remittance transaction. For example, for the remittance transaction tx_i, information related to the remittance transaction tx_i may include: the foregoing remittance transaction details, amount accumulation details generated by remittance transactions included in a blockchain transaction previously submitted by the institution 1, and a range proof RP_a indicating a sufficient balance of the institution 1.

Using a blockchain transaction generated by the device 1 as an example, when the institution 1 serves as a remitter or a relay in several remittance transactions included in the blockchain transaction, the institution 1 subtracts corresponding transfer amounts from the account balance of the blockchain account Y1 corresponding to the institution 1 (the remitter only transfers funds out; the relay not only receives funds transferred in but also may transfer funds out, and the description herein is dedicated to the operation of transferring funds out), and continues to take part in subsequent remittance transactions based on an updated remittance amount. After the blockchain transaction is submitted to the blockchain, if a remittance transaction in which the institution 1 serves as a remitter or a relay is executed successfully, the institution 1 does not need to adjust the blockchain account Y1; if a remittance transaction in which the institution 1 serves as a remitter or a relay is not executed successfully, the institution 1 may perform rollback adjustment on the account balance of the blockchain account Y1. When the blockchain transaction includes a remittance transaction in which the institution 1 serves as a recipient or a relay (the recipient only needs to receive funds transferred in; the relay not only receives funds transferred in but also needs to transfer funds out, and the description herein is dedicated to the operation of transferring funds in), if the remittance transaction is executed successfully, the institution 1 may add corresponding funds to the blockchain account Y1, to implement the receipt. If the remittance transaction is not executed successfully, the institution 1 does not need to adjust the blockchain account Y1.

Therefore, when receiving and processing the blockchain transaction submitted by the device 1, the blockchain node may mark a state of each remittance transaction according to whether the remittance transactions included in the blockchain transaction can be executed successfully or not, for example, the transaction is in a success state, a failure state, a timeout state, or the like. Correspondingly, when generating the blockchain transaction TX_a on the blockchain through clustering, the device 1 can query the marked states of the remittance transactions in the blockchain transaction previously submitted, to correspondingly determine the "amount accumulation details generated by the remittance transactions included in the blockchain transaction previously submitted by the institution 1," and the amount accumulation details include: an increase in amount (receipt) generated when it is marked that a remittance transaction in which the institution 1 serves as a relay or a recipient is in a success state, an increase in amount (rollback of a deducted transfer amount) generated when it is marked that a remittance transaction in which the institution 1 serves as a remitter or a relay is in a failure state or a timeout state, and the like. Moreover, the device 1 further generates, according to the account balance (a transfer amount of a previously submitted remittance transaction has been deducted, and the receivable is not received yet) of the blockchain account Y1 of the institution 1 and the amount accumulation details, a range proof RP_a indicating a sufficient balance of the institution 1, to prove that the blockchain funds owned by the institution 1 (a sum of the account balance of the blockchain account Y1 and funds corresponding to the amount accumulation details) are not less than funds that the institution 1 may transfer out from the remittance transaction tx_i.

Steps 504*b-c*: The devices 2 and 3 separately cluster remittance transactions in the local queues 2 and 3, to generate transactions TX_b and TX_c, sign the transactions, and then submit the transactions to the blockchain.

In some embodiments, similar to the device 1, the device 2 may select one or more remittance transactions from the local queue 2, and cluster the remittance transactions to generate a corresponding blockchain transaction. It is assumed that remittance transactions selected by the device 2 at one time include the foregoing remittance transaction tx_i, and a corresponding blockchain transaction TX_b is generated accordingly. The blockchain transaction TX_b includes a sequence number seq and information related to each selected remittance transaction. For example, for the remittance transaction tx_i, information related to the remittance transaction tx_i may include: the foregoing remittance transaction details, amount accumulation details generated by remittance transactions included in a blockchain transaction previously submitted by the institution 2, and a range proof RP_b indicating a sufficient balance of the institution 2.

In some embodiments, similar to the device 1, the device 3 may select one or more remittance transactions from the local queue 3, and cluster the remittance transactions to generate a corresponding blockchain transaction. It is assumed that remittance transactions selected by the device 3 at one time include the foregoing remittance transaction tx_i, and a corresponding blockchain transaction TX_c is generated accordingly. The blockchain transaction TX_c includes a sequence number seq and information related to each selected remittance transaction. For example, for the remittance transaction tx_i, information related to the remittance transaction tx_i may include: the foregoing remittance transaction details, amount accumulation details generated by remittance transactions included in a blockchain transaction previously submitted by the institution 3, and a range proof RP_c indicating a sufficient balance of the institution 3.

Step 504*d*: The device 4 clusters remittance transactions in a local queue 4 to generate a transaction TX_d, signs the transaction, and then submits the transaction to the blockchain.

In some embodiments, similar to the device 1, the device 4 may select one or more remittance transactions from the local queue 4, and cluster the remittance transactions to generate a corresponding blockchain transaction. It is assumed that remittance transactions selected by the device 4 at one time include the foregoing remittance transaction tx_i, and a corresponding blockchain transaction TX_d is generated accordingly. The blockchain transaction TX_d includes a sequence number seq and information related to each selected remittance transaction. For example, for the remittance transaction tx_i, information related to the remittance transaction tx_i may include: the foregoing remittance transaction details, and amount accumulation details generated by remittance transactions included in a blockchain transaction previously submitted by the institution 4. Because the institution 4 is a recipient in the remittance transaction tx_i, the institution 4 does not need to provide a range proof indicating a sufficient balance. In some embodiments, the institution 4 may serve as a remitter or a relay in other remittance transactions, and therefore still may generate, for the corresponding remittance transactions, a range proof indicating a sufficient balance.

In some embodiments, the device 1 to the device 4 may choose to generate corresponding blockchain transactions according to actual situations, but do not necessarily process the remittance transaction tx_i immediately. In other words, the device 1 to the device 4 submit the remittance transaction tx_i (included in the corresponding blockchain transactions) to the blockchain asynchronously, so that execution of the remittance transaction tx_i is allocated to the device 1 to the device 4 and triggered separately. In this way, while taking part in a large number of remittance transactions, the device 1 to the device 4 may each generate a blockchain transaction for a batch of remittance transactions that the device involved in, so that fewer blockchain transactions are generated and submitted, thereby helping reduce processing load and improve processing efficiency.

Step 505: A blockchain node processes the received blockchain transaction, to verify each remittance transaction included in the blockchain transaction.

Step 506: Mark the remittance transaction tx_i.

In some embodiments, each institution continuously submits blockchain transactions to the blockchain, while remittance transactions included in a previously submitted blockchain transaction affect remittance transactions included in a later submitted blockchain transaction. Therefore, after receiving blockchain transactions submitted by each institution, the blockchain node may read sequence numbers seq included in the received blockchain transactions, and sequentially process the blockchain transactions from the corresponding institution according to the values of the sequence numbers seq. For example, when receiving the blockchain transaction TX_a submitted by the institution 1, the blockchain node reads the sequence number seq therein, which is 100. If the sequence number seq of a latest blockchain transaction processed by the blockchain node is 98, the blockchain node may wait for a blockchain transaction submitted by the institution 1 and having a sequence number seq of 99 and processes the blockchain transaction with the sequence number 100 after the blockchain transaction with the sequence number 99 is processed.

In some embodiments, after receiving the blockchain transactions submitted by the devices 1 to 4, for each blockchain transaction, the blockchain node may extract remittance transactions in the blockchain transaction and verify each remittance transaction. Verification operations may include: verifying whether the signature is correct; verifying whether the amount accumulation details corresponding to the remittance transaction is correct, whether a range proof indicating a sufficient balance is correct, whether a range proof of the transaction amount is correct, whether a transfer-in amount and a transfer-out amount of fund transfer are consistent, and the like, which are not enumerated herein.

Figure 6:
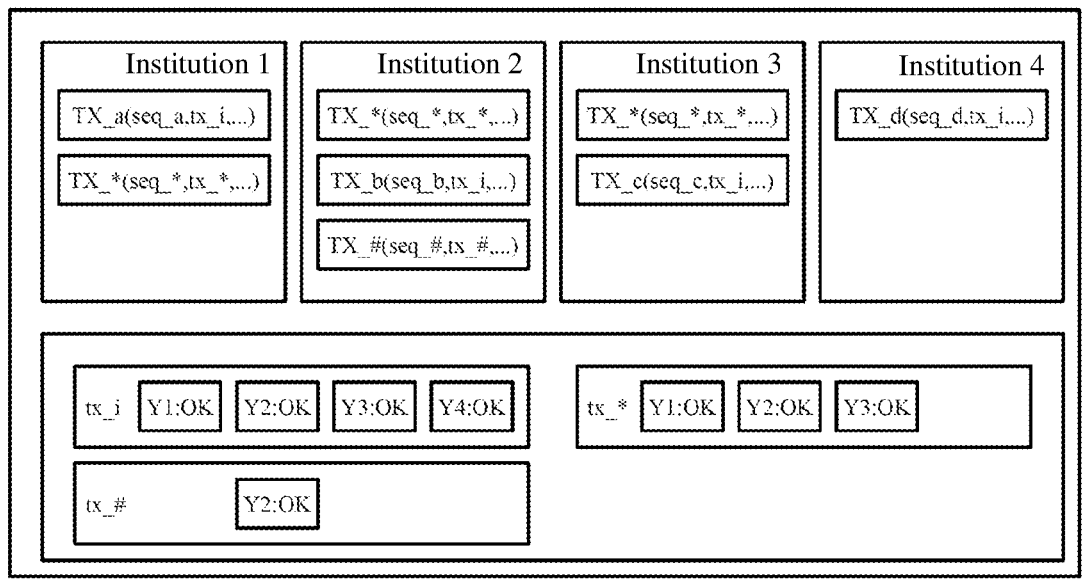
FIG. 6 is a schematic diagram of collection of triggering information statistics according to some embodiments.

In some embodiments, in addition to individually verifying the remittance transactions included in each blockchain transaction, the blockchain node may further verify whether each user of the remittance transaction performs a triggering operation (that is, submits a blockchain transaction including the remittance transaction). For example, FIG. 6 is a schematic diagram of collection of triggering information statistics according to some embodiments. As shown in FIG. 6, based on a native function of the blockchain or an extended function provided by a smart contract, the blockchain node may record blockchain transactions submitted by the institution 1 to the institution 4, for example, blockchain transactions TX_a and TX_* submitted by the institution 1, blockchain transactions TX_*, TX_b, and TX_# submitted by the institution 2, blockchain transactions TX_* and TX_c submitted by the institution 3, and a blockchain transaction TX_d submitted by the institution 4. The blockchain node may extract remittance transactions included in each blockchain transaction, and collect statistics on users of each remittance transaction (remittance transaction details include information such as a remitter, a relay, and a recipient): when a received blockchain transaction submitted by a corresponding user includes the remittance transaction and the remittance transaction passes the foregoing individual verification, the user may be marked as "OK."

For example, because the blockchain transaction TX_a submitted by the device 1 includes the remittance transaction tx_i, if content that is in the blockchain transaction TX_a and corresponds to the remittance transaction tx_i passes verification, the blockchain node may make a mark "Y1:OK" as shown in FIG. 6. Similarly, if the blockchain node further marks the institution 2 to the institution 4 as "Y2:OK," "Y3:OK," and "Y4:OK" respectively, the blockchain node may determine that the remittance transaction tx_i has been confirmed by all the users, and it can be marked that the remittance transaction tx_i is in a success state.

In another example, only the blockchain transactions submitted by the device 1, the device 2, and the device 3 include related information of the remittance transaction tx*; therefore, even if all the information has passed the individual verification, the blockchain node can add marks "Y1:OK," "Y2:OK," and "Y3:OK" to the remittance transaction tx*, and wait for the blockchain transaction submitted by the device 4.

In another example, only the blockchain transaction submitted by the device 2 includes related information of the remittance transaction tx_#; therefore, even if the related information has passed the individual verification, the blockchain node can add a mark "Y2:OK" to the remittance transaction tx_#, and wait for the blockchain transactions submitted by the device 1, the device 3, and the device 4.

Still using the remittance transaction tx_i as an example, if any user among the institution 1 to the institution 4 cannot submit the blockchain transaction including the remittance transaction tx_i before a transaction moment arrives, the blockchain node mark that the remittance transaction tx_i is in a timeout state, so that the remittance transaction tx_i cannot be executed successfully. If any user among the institution 1 to the institution 4 submits the blockchain transaction including the remittance transaction tx_i, but the remittance transaction tx_id does not pass the individual verification due to an error in the amount accumulation details, an error in the range proof, or other reasons, the blockchain node marks that the remittance transaction tx_i is in a failure state, so that the remittance transaction tx_i cannot be executed successfully.

When a mark such as a success state, a failure state, or a timeout state is added by the blockchain node to the remittance transaction tx_i or other remittance transactions, during generating of blockchain transactions subsequently, the institution 1 to the institution 4 may refer to these states to generate corresponding amount accumulation details, a range proof indicating a sufficient balance, and the like. This is similar to the process described in steps 504a to 504d above, and details are not described herein again.

After confirming that the remittance transaction tx_i is executed successfully, the institution 1 receives 500 HKD from the user 1 out of the blockchain, and transfers 500 HKD to the institution 2; the institution 2 receives 500 HKD transferred from the institution 1, and transfers 56 EUR to the institution 3; the institution 3 receives 56 EUR transferred from the institution 2, and transfers 64 USD to the institution 4; the institution 4 receives 64 USD transferred from the institution 3, and transfers 64 USD to the user 1 out of the blockchain. This is equivalent to that the institutions 1 to 4 achieve a balance between payments and receipts, and the user 1 completes an operation of remitting 500 HKD to the user 2.

Data changes embodied on the blockchain ledger are as follows: the blockchain account Y1 corresponding to the institution 1 is updated to be (currency_1, PC(a−t1, r_a−r_t1), Enc_A (a−t1), Enc_A (r_a−r_t1)), which is decreased by 500 HKD; the blockchain account Y2 corresponding to the institution 2 is updated to be (currency_1, PC(b1+t1, r_b1+r_t1), Enc_B(b1+t1), Enc_B(r_b1+r_t1)), (currency_2, PC(b2−t2, r_b2−r_t2), Enc_B(b2−t2), Enc_B (r_b2−r_t2)), which is increased by 500 HKD and decreased by 56 EUR; the blockchain account Y3 corresponding to the institution 3 is updated to be (currency_2, PC(c1+t2, r_c1+r_t2), Enc_C(c1+t2), Enc_C(r_c1+r_t2)), (currency_3, PC(c2−t3, r_c2−r_t3), Enc_C(c2−t3), Enc_C(r_c2−r_t3)), which is increased by 56 EUR and decreased by 64 USD; the blockchain account Y4 corresponding to the institution 4 is updated to be (currency_3, PC(d+t3, r_d+r_t3), Enc_D(d+t3), Enc_D(r_d+r_t3)), which is increased by 64 USD.

Figure 7:
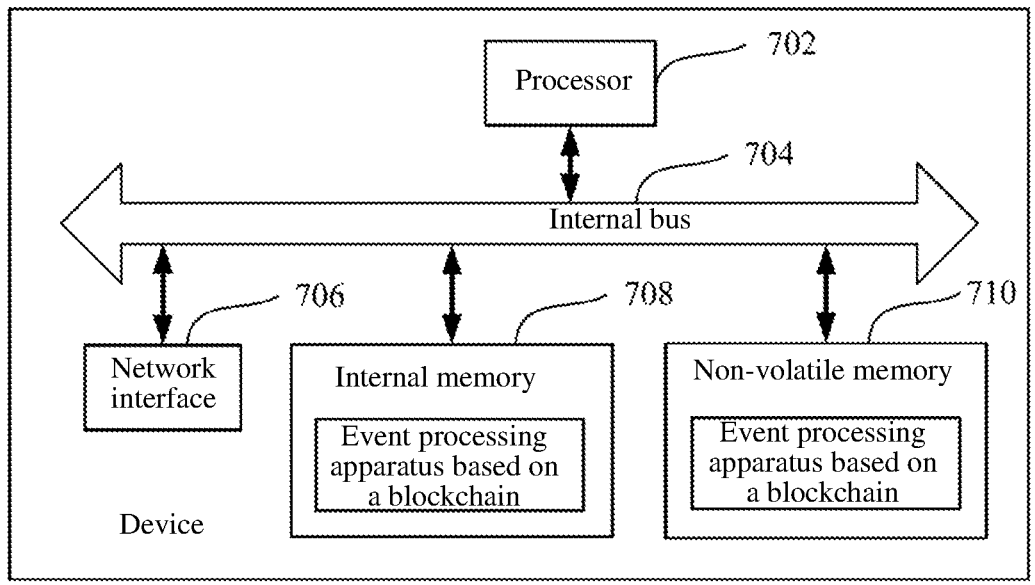
FIG. 7 is a schematic structural diagram of a blockchain-based event processing device according to some embodiments.

FIG. 7 is a schematic structural diagram of a blockchain-based event processing device according to some embodiments. Referring to FIG. 7, on a hardware level, the device includes a processor 702, an internal bus 704, a network interface 706, an internal memory 708, and a non-volatile memory 710, and may further include other hardware for services. The processor 702 reads computer programs from the non-volatile memory 710 into the internal memory 708 and then executes the computer programs, to form an event processing apparatus based on a blockchain on a logic level. In some embodiments, in addition to the software implementation, one or more embodiments of the specification do not exclude other implementations, such as a logic device or a combination of software and hardware. In other words, entities executing the processes are not limited to the logic units but may also be hardware or logic devices.

Figure 8:
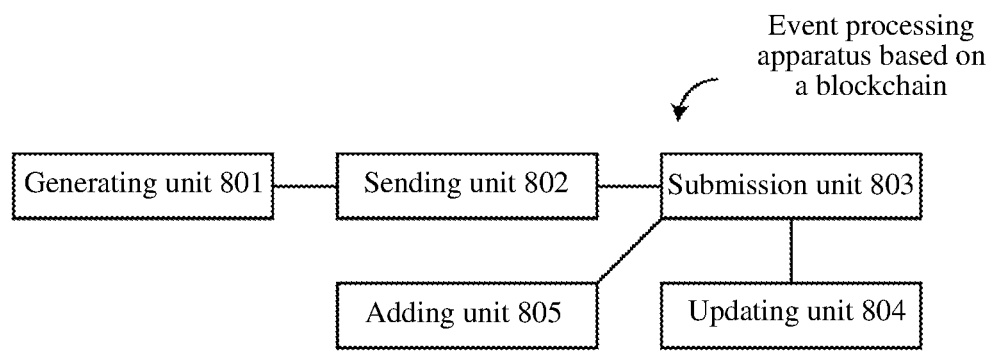
FIG. 8 is a block diagram of a blockchain-based event processing apparatus according to some embodiments.

FIG. 8 is a block diagram of a blockchain-based event processing apparatus according to some embodiments. The illustrated event processing apparatus based on a blockchain is implementable by any user involved in the event, and may include:

a generating unit 801, configured to generate, according to an event that the user is involved in, descriptive information of the event;

a sending unit 802, configured to send the descriptive information to another user of the event through an off-chain channel for the another user to verify the descriptive information and to submit triggering information associated with the another user corresponding to the event to the blockchain after verifying the descriptive information; and a submission unit 803, configured to submit triggering information corresponding to the event to the blockchain for the blockchain to process the event according to the descriptive information after verifying all triggering information submitted by the plurality of users.

In some embodiments, the triggering information includes: the descriptive information and confirmation generated by the user submitting the triggering information, the confirmation indicating the user has verified the descriptive information.

In some embodiments, the descriptive information includes a variable, and the event changes a state parameter recorded on the blockchain associated with each of the plurality users according to the variable.

In some embodiments, the value of the state parameter corresponding to each user and the variable are each a ciphertext calculated based on a homomorphic encryption algorithm or a homomorphic commitment algorithm.

In some embodiments, the descriptive information further includes: first proof information, the first proof information being used for proving that the variable is in a correct numerical range; and when the event decreases the value of the state parameter corresponding to the user according to the variable, the triggering information includes: second proof information, the second proof information being used for proving that the value of the state parameter corresponding to the user is not less than the decrease in the value.

In some embodiments, when the event increases the value of the state parameter corresponding to the user according to the variable, the triggering information includes: third proof information, the third proof information being used for proving that the increase in the value is in a correct numerical range; and when the event decreases the value of the state parameter corresponding to the user to decrease according to the variable, the triggering information includes: fourth proof information, the fourth proof information being used for proving that the decrease in the value is in the correct numerical range, and that the value of the state parameter corresponding to the user is not less than the decrease in the value.

In some embodiments, the apparatus further includes: an updating unit 804, configured to update the value of the state parameter corresponding to the user according to another event that the user is involved in, so as to generate the triggering information based on the updated value of the state parameter.

In some embodiments, when the event includes a transfer event, users of the event include: a remitter and a recipient; the variable includes: a transfer amount; and the state parameter includes: an account balance; when the event includes a remittance event, users of the event include: a remitter, a relay, and a recipient; the variable includes: a first transfer amount of a first-type asset between the remitter and the relay, and a second transfer amount of a second-type asset between the relay and the recipient; and the state parameter includes: an account balance; and when the event includes a remittance event involving more than one relays, users of the event include: a remitter, n relays, and a recipient; the variable includes: a transfer amount of an $i^{th}$-type asset between an $i^{th}$-type asset between an $(i-1)^{th}$ relay and an $i^{th}$ relay, and a transfer amount of an $(n+1)^{th}$-type asset between an $n^{th}$ relay and the recipient; and the state parameter includes: an account balance, where $1 < i \le n$.

In some embodiments, the submission unit 803 is specifically configured to: add the triggering information to a waiting queue as a to-be-submitted transaction; create a merged transaction by including one or more to-be-submitted transactions selected from the waiting queue according to a predetermined rule; and submit the merged transaction to the blockchain for processing the one or more to-be-submitted transactions in the merged transaction in the blockchain.

In some embodiments, the apparatus further includes: an adding unit 805, configured to tag a number to each merged transaction according to a generating sequence, so that each merged transaction is sequentially processed in the blockchain according to a value of the corresponding number.

Figure 9:
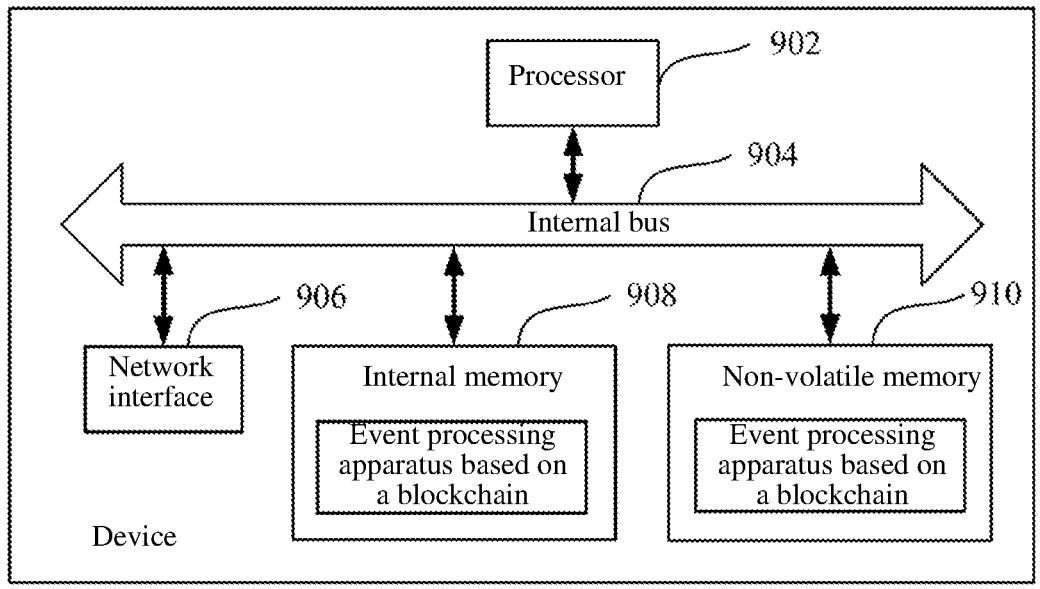
FIG. 9 is a schematic structural diagram of another blockchain-based event processing device according to some embodiments.

FIG. 9 is a schematic structural diagram of another blockchain-based event processing device according to some embodiments. Referring to FIG. 9, on a hardware level, the device includes a processor 902, an internal bus 904, a network interface 906, an internal memory 908, and a non-volatile memory 910, and may further include other hardware for services. The processor 902 reads computer programs from the non-volatile memory 910 into the internal memory 908 and then executes the computer programs, to form an event processing apparatus based on a blockchain on a logic level. In some embodiments, in addition to the software implementation, one or more embodiments of the specification do not exclude other implementations, such as a logic device or a combination of software and hardware. In other words, entities executing the processes are not limited to the logic units but may also be hardware or logic devices.

Figure 10:
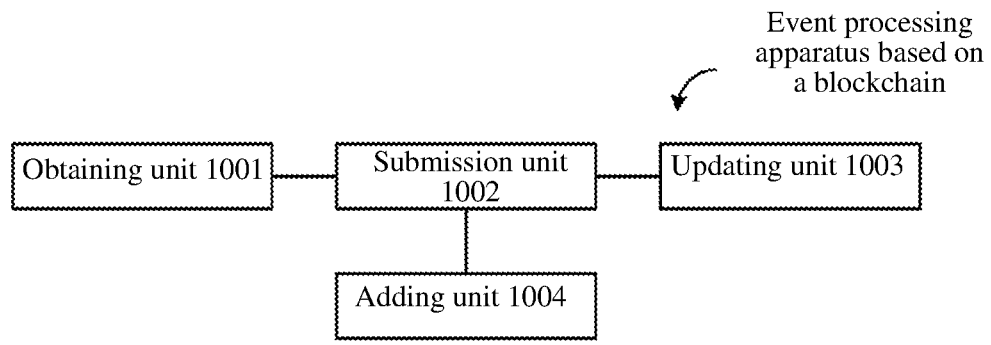
FIG. 10 is a block diagram of another blockchain-based event processing apparatus according to some embodiments.

FIG. 10 is a block diagram of another blockchain-based event processing apparatus according to some embodiments. The illustrated event processing apparatus based on a blockchain is implementable by any user involved in the event, and may include: an obtaining unit 1001, configured to obtain descriptive information of an event, the descriptive information being sent by any user of the event through an off-chain channel; and a submission unit 1002, configured to submit triggering information corresponding to the event to the blockchain after verifying the descriptive information for the blockchain to process the event according to the descriptive information after verifying all triggering information submitted by the plurality of users.

In some embodiments, the triggering information includes: the descriptive information and confirmation generated by the user submitting the triggering information, the confirmation indicating the user has verified the descriptive information.

In some embodiments, the descriptive information includes a variable, and the event changes a state parameter recorded on the blockchain associated with each of the plurality users according to the variable.

In some embodiments, the value of the state parameter corresponding to each user and the variable are each a ciphertext calculated based on a homomorphic encryption algorithm or a homomorphic commitment algorithm.

In some embodiments, the descriptive information further includes: first proof information, the first proof information being used for proving that the variable is in a correct numerical range; and when the event decreases the value of the state parameter corresponding to the user according to the variable, the triggering information includes: second proof information, the second proof information being used for proving that the value of the state parameter corresponding to the user is not less than the decrease in the value.

In some embodiments, when the event increases the value of the state parameter corresponding to the user according to the variable, the triggering information includes: third proof information, the third proof information being used for proving that the increase in the value is in a correct numerical range; and when the event decreases the value of the state parameter corresponding to the user according to the variable, the triggering information includes: fourth proof information, the fourth proof information being used for proving that the decrease in the value is in the correct numerical range, and that the value of the state parameter corresponding to the user is not less than the decrease in the value.

In some embodiments, the apparatus further includes: an updating unit 1003, configured to update the value of the state parameter corresponding to the user according to another event that the user is involved in, so as to generate the triggering information based on the updated value of the state parameter.

In some embodiments, when the event includes a transfer event, users of the event include: a remitter and a recipient; the variable includes: a transfer amount; and the state parameter includes: an account balance; when the event includes a remittance event, users of the event include: a remitter, a relay, and a recipient; the variable includes: a first transfer amount of a first-type asset between the remitter and the relay, and a second transfer amount of a second-type asset between the relay and the recipient; and the state parameter includes: an account balance; and when the event includes a remittance event involving more than one relays, users of the event include: a remitter, n relays, and a recipient; the variable includes: a transfer amount of an $i^{th}$-type asset between an $i^{th}$-type asset between an $(i-1)^{th}$ relay and an $i^{th}$ relay, and a transfer amount of an $(n+1)^{th}$-type asset between an $n^{th}$ relay and the recipient; and the state parameter includes: an account balance, where $1 < i \leq n$.

In some embodiments, the submission unit 1002 is specifically configured to: add the triggering information to a waiting queue as a to-be-submitted transaction; create a merged transaction by including one or more to-be-submitted transactions selected from the waiting queue according to a predetermined rule; and submit the merged transaction to the blockchain for processing the one or more to-be-submitted transactions in the merged transaction in the blockchain.

In some embodiments, the apparatus further includes: an adding unit 1004, configured to tag a number to each merged transaction according to a generating sequence, so that each merged transaction is sequentially processed in the blockchain according to a value of the corresponding number.

Figure 11:
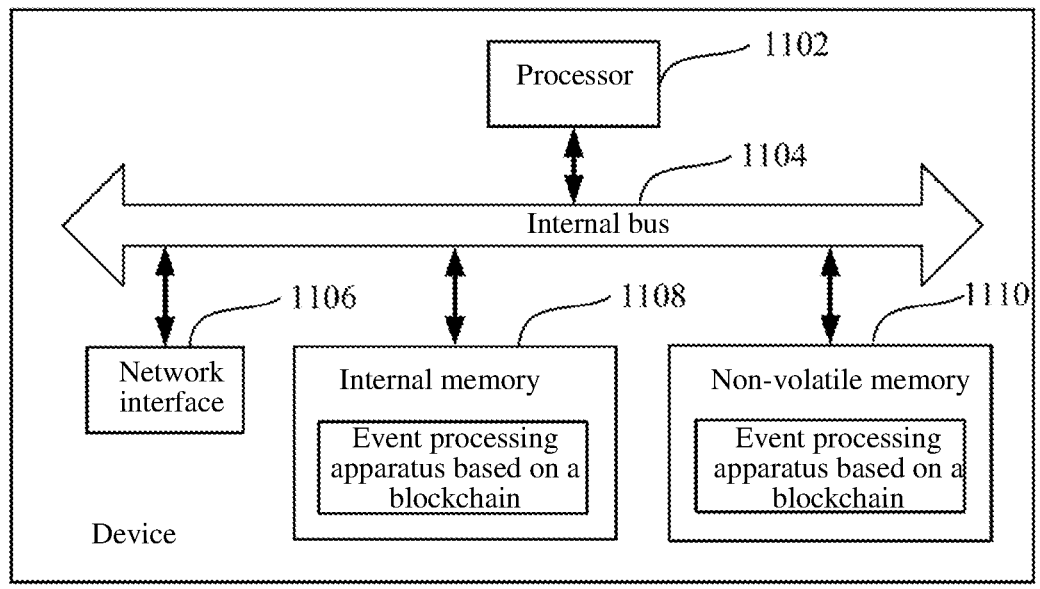
FIG. 11 is a schematic structural diagram of still another blockchain-based event processing device according to some embodiments.

FIG. 11 is a schematic structural diagram of still another blockchain-based event processing device according to some embodiments. Referring to FIG. 11, on a hardware level, the device includes a processor 1102, an internal bus 1104, a network interface 1106, an internal memory 1108, and a non-volatile memory 1110, and may further include other hardware for services. The processor 1102 reads computer programs from the non-volatile memory 1110 into the internal memory 1108 and then executes the computer programs, to form an event processing apparatus based on a blockchain on a logic level. In some embodiments, in addition to the software implementation, one or more embodiments of the specification do not exclude other implementations, such as a logic device or a combination of software and hardware. In other words, entities executing the processes are not limited to the logic units but may also be hardware or logic devices.

Figure 12:
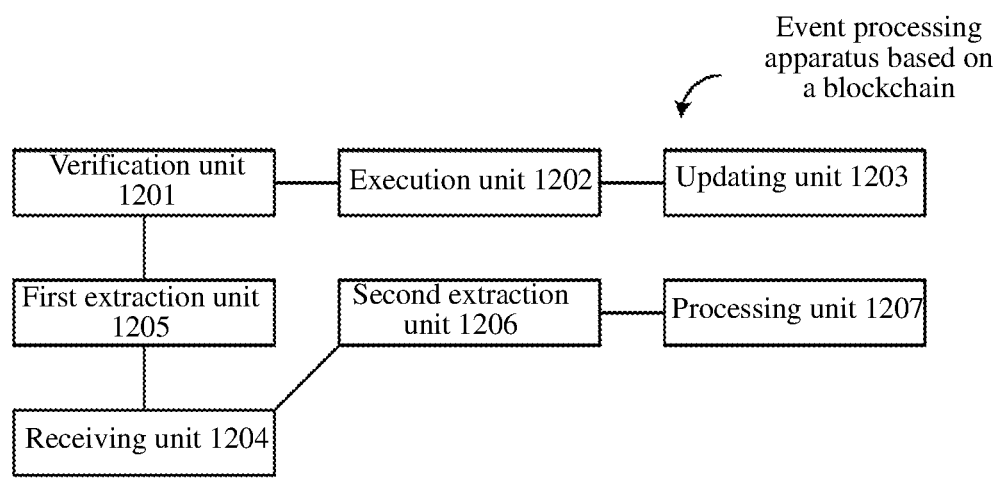
FIG. 12 is a block diagram of still another blockchain-based event processing apparatus according to some embodiments.

FIG. 12 is a block diagram of still another blockchain-based event processing apparatus according to some embodiments. The illustrated event processing apparatus based on a blockchain is implementable by a blockchain node, and may include: a verification unit 1201, configured to verify triggering information submitted by a user of the event, wherein the triggering information is submitted by the user to the blockchain after verifying descriptive information of the event; and an execution unit 1202, configured to process the event based on the descriptive information after verifying all triggering information submitted by the plurality of users.

In some embodiments, after being generated by any user of the event, the descriptive information is sent to another user through an off-chain channel for confirmation.

In some embodiments, the triggering information includes: the descriptive information and confirmation generated by the user submitting the triggering information, the confirmation indicating the user has verified the descriptive information.

In some embodiments, the descriptive information includes a variable, and the event changes a state parameter recorded on the blockchain associated with each of the plurality users according to the variable.

In some embodiments, the value of the state parameter corresponding to each user and the variable are each a ciphertext calculated based on a homomorphic encryption algorithm or a homomorphic commitment algorithm.

In some embodiments, the descriptive information further includes: first proof information, the first proof information being used for proving that the variable is in a correct numerical range; and when the event decreases the value of the state parameter corresponding to the user according to the variable, the triggering information includes: second proof information, the second proof information proving that the value of the state parameter corresponding to the user is not less than the decrease in the value.

In some embodiments, when the event increases the value of the state parameter corresponding to the user according to the variable, the triggering information includes: third proof information, the third proof information being used for proving that the increase in the value is in a correct numerical range; and when the event decreases the value of the state parameter corresponding to the user according to the variable, the triggering information includes: fourth proof information, the fourth proof information being used for proving that the decrease in the value is in the correct numerical range, and that the value of the state parameter corresponding to the user is not less than the decrease in the value.

In some embodiments, the apparatus further includes: an updating unit 1203, configured to update the value of the state parameter corresponding to the user according to another event that the user is involved in, so that the user generates the triggering information based on the updated value of the state parameter.

In some embodiments, when the event includes a transfer event, users of the event include: a remitter and a recipient; the variable includes: a transfer amount; and the state parameter includes: an account balance; when the event includes a remittance event, users of the event include: a remitter, a relay, and a recipient; the variable includes: a first transfer amount of a first-type asset between the remitter and the relay, and a second transfer amount of a second-type asset between the relay and the recipient; and the state parameter includes: an account balance; and when the event includes a remittance event involving more than one relays, users of the event include: a remitter, n relays, and a recipient; the variable includes: a transfer amount of an $i^{th}$-type asset between an $i^{th}$-type asset between an $(i-1)^{th}$ relay and an $i^{th}$ relay, and a transfer amount of an $(n+1)^{th}$-type asset between an $n^{th}$ relay and the recipient; and the state parameter includes: an account balance, where $1 < i \leq n$.

In some embodiments, the apparatus further includes: a receiving unit 1204, configured to receive a merged transaction submitted by the user, the merged transaction including one or more to-be-submitted transactions selected from a local waiting queue by the user. Triggering information is added to the waiting queue as a to-be-submitted transaction after the user verifies the descriptive information; and a first extraction unit 1205, configured to extract each to-be-submitted transaction included in the merged transaction, so as to process each to-be-submitted transaction separately.

In some embodiments, the apparatus further includes: a second extraction unit 1206, configured to extract a number associated with the merged transaction, the number being added by the user according to a generating sequence of the merged transaction; and a processing unit 1207, configured to sequentially process the received merged transaction according to a value of the corresponding number.

The system, apparatus, modules or units illustrated in the foregoing embodiment may be specifically implemented by a computer chip or an entity or implemented by a product having a specific function. A typical implementation device is a computer, and a specific form of the computer may be a personal computer, a laptop computer, a cellular phone, a camera phone, a smartphone, a personal digital assistant, a media player, a navigation device, an email sending and receiving device, a game console, a tablet computer, or a wearable device, or a combination of any of these devices.

The specification provides a computer readable medium, on which computer instructions are stored. When the instructions are executed, some embodiments of the specification, such as the event processing methods based on a blockchain in any of the foregoing embodiments, are implemented. Details are not described herein again.

In a typical configuration, the computer includes one or more processors (CPUs), an input/output interface, a network interface, and a memory.

The memory may include forms such as a non-volatile memory in a computer readable medium, a random-access memory (RAM), and/or a non-volatile memory, such as a read-only memory (ROM) or a flash memory (flash RAM). The memory is an example of the computer readable medium.

The computer readable medium includes volatile and non-volatile, removable and non-removable media, which may store information by using any method or technology. The information may be a computer readable instruction, a data structure, a program module, or other data. The example of the computer storage medium includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a disk storage, a quantum memory, a grapheme-based storage medium or other magnetic storage devices, or any other non-transmission media, which may be configured to store information that may be accessed by a computing device. According to the specification, the computer readable medium does not include transitory computer readable media (transitory media), such as a modulated data signal and carrier.

The terms "include," "comprise," and any variants thereof herein are intended to cover a non-exclusive inclusion. Therefore, in the context of a process, a method, a commodity, or a device that includes a series of elements, the process, method, commodity or device not only includes such elements, but also includes other elements not specified expressly, or may include elements inherent to the process, method, commodity or device. Unless otherwise specified, an element limited by "include a/an . . . " does not exclude other same elements existing in the process, method, commodity or device that includes the element.

Some embodiments of the specification are described above. Other embodiments may fall within the scope of the appended claims. In some embodiments, the actions or steps recorded in the claims may be performed in a sequence different from that in other embodiments and can still achieve an expected result. In addition, the process depicted in the accompanying drawing can achieve the expected result without necessarily following the sequence shown or a consecutive sequence. In some implementations, multi-task processing and parallel processing are also possible and may be beneficial.

The terms used in some embodiments of the specification are merely for the purpose of describing the specific embodiments and are not intended to limit one or more embodiments of the specification. The singular forms "one," "said," and "the" used in one or more embodiments of the specification and the appended claims are also intended to include plurality forms, unless otherwise indicated clearly in the context. The term "and/or" used in this text refers to and include any or all possible combinations of one or more associated items listed.

Terms such as first, second, and third may be used in one or more embodiments of the specification to describe various information, and the information is not limited to these terms. These terms are merely used for distinguishing information of the same type from each other. For example, without departing from the scope of one or more embodiments of the specification, first information may also be referred to as second information. Similarly, second information may also be referred to as first information. Depending on the context, the word "if" used herein may be interpreted as "while" or "when" or "in response to determining of."

The foregoing descriptions are merely some embodiments of the specification but are not intended to limit the scope of the specification. Any modification, equivalent replacement, or improvement made within the spirit and the principle of one or more embodiments of the specification shall fall within the protection scope of the specification.

What is claimed is:

1. A blockchain-based event processing method for processing an event involving a plurality of users in a blockchain, the method comprising:
   generating, by a computing device of a first user of the plurality of users, descriptive information of the event, wherein the descriptive information comprises:
      one or more blockchain account addresses of one or more second users of the plurality of users,
      for each of the second users, a variable representing an amount to be transferred into a blockchain account of the each second user, wherein the variable is encrypted with a homomorphic encryption algorithm or a homomorphic commitment algorithm based on a public key of the each second user, and a first range proof that the variable is within a numerical range;
   sending, by the computing device of the first user, the descriptive information to each of the second users through an off-chain channel for the each second user to verify the descriptive information and to submit second triggering information associated with the each second user corresponding to the event to the blockchain after verifying the descriptive information, wherein the second triggering information associated with the each second user comprises:
  signature information generated for the descriptive information by the each second user through a private key of the each second user, and
  a second range proof that a state parameter of the each second user stored in the blockchain is not less than an amount determined based on the variable; and
submitting, by the computing device of the first user, first triggering information associated with the first user corresponding to the event to the blockchain for the blockchain to process the event according to the descriptive information after the blockchain verifies all triggering information submitted by the plurality of users.

2. The method according to claim 1, wherein the second triggering information further comprises the descriptive information.

3. The method according to claim 1, wherein the event changes a state parameter recorded on the blockchain associated with the each second user according to the corresponding variable.

4. The method according to claim 3, wherein the state parameter is a ciphertext calculated based on the homomorphic encryption algorithm or the homomorphic commitment algorithm.

5. The method according to claim 4, wherein the descriptive information further comprises: a first proof proving that the variable is within a numerical range.

6. The method according to claim 3, wherein in response to the event being a transfer event, the plurality of users of the event comprise a remitter and a recipient; and the state parameter comprises an account balance.

7. The method according to claim 3, wherein in response to the event being a remittance event comprising a remitter, n relays, and a recipient, the first user corresponds to the remitter, the one or more second users correspond to the n relays and the recipient; and
  the variable corresponding to a first relay of the n relays comprises a transfer amount of a first-type asset between the remitter and the first relay;
  the variable corresponding to an i-th relay of the n relays comprises a transfer amount of an $i^{th}$-type asset between an $(i-1)^{th}$ relay and an $i^{th}$ relay, wherein $1<i\le n$; and
  the variable corresponding the recipient comprises a transfer amount of an $(n+1)^{th}$-type asset between an $n^{th}$ relay and the recipient.

8. The method according to claim 1, wherein submitting triggering information associated with the first user corresponding to the event to the blockchain comprises:
  adding the triggering information to a waiting queue as a to-be-submitted transaction;
  creating a merged transaction by including one or more to-be-submitted transactions selected from the waiting queue according to a predetermined rule; and
  submitting the merged transaction to the blockchain for processing the one or more to-be-submitted transactions in the merged transaction in the blockchain.

9. A system for processing an event involving a plurality of users in a blockchain, comprising one or more processors and one or more non-transitory computer-readable memories coupled to the one or more processors and configured with instructions executable by the one or more processors to cause the system to perform operations comprising:
  generating, by a computing device of a first user of the plurality of users, descriptive information of the event, wherein the descriptive information comprises:
    one or more blockchain account addresses of one or more second users of the plurality of users,
    for each of the second users, a variable representing an amount to be transferred into a blockchain account of the each second user, wherein the variable is encrypted with a homomorphic encryption algorithm or a homomorphic commitment algorithm based on a public key of the each second user, and a first range proof that the variable is within a numerical range;
  sending, by the computing device of the first user, the descriptive information to each of the second users through an off-chain channel for the each second user to verify the descriptive information and to submit second triggering information associated with the each second user corresponding to the event to the blockchain after verifying the descriptive information, wherein the second triggering information associated with the each second user comprises:
    signature information generated for the descriptive information by the each second user through a private key of the each second user, and
    a second range proof that a state parameter of the each second user stored in the blockchain is not less than an amount determined based on the variable; and
  submitting, by the computing device of the first user, first triggering information associated with the first user corresponding to the event to the blockchain for the blockchain to process the event according to the descriptive information after the blockchain verifies all triggering information submitted by the plurality of users.

10. The system according to claim 9, wherein the second triggering information further comprises the descriptive information.

11. The system according to claim 9, wherein the event changes a state parameter recorded on the blockchain associated with the each second user according to the corresponding variable.

12. The system according to claim 11, wherein the state parameter is a ciphertext calculated based on the homomorphic encryption algorithm or the homomorphic commitment algorithm.

13. The system according to claim 12, wherein the descriptive information further comprises: a first proof proving that the variable is within a numerical range.

14. The system according to claim 11, wherein in response to the event being a transfer event, the plurality of users of the event comprise a remitter and a recipient; and the state parameter comprises an account balance.

15. The system according to claim 11, wherein in response to the event being a remittance event comprising a remitter, n relays, and a recipient, the first user corresponds to the remitter, the one or more second users corresponds to the n relays and the recipient; and
  the variable corresponding to a first relay of the n relays comprises a transfer amount of a first-type asset between the remitter and the first relay;
  the variable corresponding to an i-th relay of the n relays comprises a transfer amount of an $i^{th}$-type asset between an $(i-1)^{th}$ relay and an $i^{th}$ relay, wherein $1<i\le n$; and
  the variable corresponding the recipient comprises a transfer amount of an $(n+1)^{th}$-type asset between an $n^{th}$ relay and the recipient.

16. A non-transitory computer-readable storage medium for processing an event involving a plurality of users in a blockchain configured with instructions executable by one or more processors to cause the one or more processors to perform operations comprising:

generating descriptive information of the event, wherein the descriptive information comprises:

one or more blockchain account addresses of one or more second users of the plurality of users, for each of the second users, a variable representing an amount to be transferred into a blockchain account of the each second user, wherein the variable is encrypted with a homomorphic encryption algorithm or a homomorphic commitment algorithm based on a public key of the each second user, and a first range proof that the variable is within a numerical range;

sending the descriptive information to each of the second users through an off-chain channel for the each second user to verify the descriptive information and to submit second triggering information associated with the each second user corresponding to the event to the blockchain after verifying the descriptive information, wherein the second triggering information associated with the each second user comprises:

signature information generated for the descriptive information by the each second user through a private key of the each second user, and a second range proof that a state parameter of the each second user stored in the blockchain is not less than an amount determined based on the variable; and submitting a first triggering information associated with the first user corresponding to the event to the blockchain for the blockchain to process the event according to the descriptive information after the blockchain verifies all triggering information submitted by the plurality of users.

17. The storage medium according to claim 16, wherein the second triggering information further comprises the descriptive information.

18. The storage medium according to claim 16, wherein in response to the event being a remittance event comprising a remitter, n relays, and a recipient, the first user corresponds to the remitter, the one or more second users corresponds to the n relays and the recipient; and the variable corresponding to a first relay of the n relays comprises a transfer amount of a first-type asset between the remitter and the first relay;

the variable corresponding to an i-th relay of the n relays comprises a transfer amount of an $i^{th}$-type asset between an $(i-1)^{th}$ relay and an $i^{th}$ relay, wherein $1 < i \leq n$; and the variable corresponding the recipient comprises a transfer amount of an $(n+1)^{th}$-type asset between an $n^{th}$ relay and the recipient.

* * * * *